(12) United States Patent
Masputra et al.

(10) Patent No.: US 11,178,259 B2
(45) Date of Patent: Nov. 16, 2021

(54) METHODS AND APPARATUS FOR REGULATING NETWORKING TRAFFIC IN BURSTY SYSTEM CONDITIONS

(71) Applicant: Apple Inc., Cupertino, CA (US)

(72) Inventors: Cahya Adiansyah Masputra, Cupertino, CA (US); Sandeep Nair, Cupertino, CA (US); Karan Sanghi, Cupertino, CA (US); Mingzhe Zhang, Cupertino, CA (US); Jason McElrath, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 16/146,533

(22) Filed: Sep. 28, 2018

(65) Prior Publication Data

US 2019/0306281 A1    Oct. 3, 2019

Related U.S. Application Data

(60) Provisional application No. 62/649,509, filed on Mar. 28, 2018.

(51) Int. Cl.
*H04L 29/06* (2006.01)
*H04L 12/46* (2006.01)
(Continued)

(52) U.S. Cl.
CPC .......... *H04L 69/162* (2013.01); *G06F 3/0604* (2013.01); *G06F 3/0631* (2013.01); *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01);
(Continued)

(58) Field of Classification Search
CPC . H04L 69/162; H04L 12/4641; H04L 63/166; H04L 69/163; H04L 69/164; G06F 9/545
See application file for complete search history.

(56) References Cited

U.S. PATENT DOCUMENTS 5,367,688 A    11/1994   Croll
6,032,179 A     2/2000   Osborne
(Continued)

*Primary Examiner* — Abdulkader M Alriyashi
(74) *Attorney, Agent, or Firm* — Sterne, Kessler, Goldstein & Fox P.L.L.C.

(57) ABSTRACT

Methods and apparatus for efficient data transfer within a user space network stack. Unlike prior art monolithic networking stacks, the exemplary networking stack architecture described hereinafter includes various components that span multiple domains (both in-kernel, and non-kernel). For example, unlike traditional "socket" based communication, disclosed embodiments can transfer data directly between the kernel and user space domains. Direct transfer reduces the per-byte and per-packet costs relative to socket based communication. A user space networking stack is disclosed that enables extensible, cross-platform-capable, user space control of the networking protocol stack functionality. The user space networking stack facilitates tighter integration between the protocol layers (including TLS) and the application or daemon. Exemplary systems can support multiple networking protocol stack instances (including an in-kernel traditional network stack).

20 Claims, 16 Drawing Sheets

(51) Int. Cl.
| | | |
|---|---|---|
| G06F 9/54 | (2006.01) | |
| G06F 9/48 | (2006.01) | |
| G06F 9/50 | (2006.01) | |
| G06F 12/10 | (2016.01) | |
| G06F 13/16 | (2006.01) | |
| G06F 3/06 | (2006.01) | |
| G06F 9/46 | (2006.01) | |
| G06F 12/02 | (2006.01) | |
| H04L 12/859 | (2013.01) | |
| H04L 12/851 | (2013.01) | |
| H04L 12/863 | (2013.01) | |
| H04L 12/935 | (2013.01) | |
| H04L 12/861 | (2013.01) | |
| G06F 9/455 | (2018.01) | |
| H04L 12/801 | (2013.01) | |
| H04L 12/841 | (2013.01) | |
| G06F 9/52 | (2006.01) | |
| H04L 12/26 | (2006.01) | |
| G06F 16/23 | (2019.01) | |
| G06F 21/52 | (2013.01) | |
| H04L 12/833 | (2013.01) | |
| H04L 12/835 | (2013.01) | |
| H04L 12/823 | (2013.01) | |
| H04L 12/865 | (2013.01) | |
| G06F 21/56 | (2013.01) | |
| G06F 16/22 | (2019.01) | |
| H04L 29/12 | (2006.01) | |
| H04L 29/08 | (2006.01) | |
| H04L 1/00 | (2006.01) | |

(52) U.S. Cl.
CPC .............. *G06F 9/5022* (2013.01); *G06F 9/52* (2013.01); *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(56) References Cited

U.S. PATENT DOCUMENTS

| | | |
|---|---|---|
| 7,100,020 B1 | 8/2006 | Brightman et al. |
| 7,152,231 B1 | 12/2006 | Galluscio et al. |
| 7,398,382 B2 | 7/2008 | Rothman et al. |
| 7,506,084 B2 | 3/2009 | Moerti et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,941,682 B2 | 5/2011 | Adams |
| 8,230,248 B2 | 7/2012 | Dance et al. |
| 8,255,725 B2 | 8/2012 | Shimazaki et al. |
| 8,352,624 B2 | 1/2013 | Zimmerman et al. |
| 8,555,099 B2 | 10/2013 | Marinkovic et al. |
| 8,769,168 B2 | 7/2014 | Moertl et al. |
| 9,135,059 B2 | 9/2015 | Ballard et al. |
| 9,170,957 B2 | 10/2015 | Touzni et al. |
| 9,280,360 B2 | 3/2016 | Xu et al. |
| 9,594,718 B2 | 3/2017 | Kaushik et al. |
| 9,959,124 B1 | 5/2018 | Herbeck et al. |
| 10,078,361 B2 | 9/2018 | Sanghi et al. |
| 10,289,555 B1 | 5/2019 | Michaud et al. |
| 10,534,601 B1 | 1/2020 | Venkata et al. |
| 2001/0037410 A1 | 11/2001 | Gardner |
| 2002/0053011 A1 | 5/2002 | Aiken et al. |
| 2002/0169938 A1 | 11/2002 | Scott et al. |
| 2003/0061395 A1 | 3/2003 | Kingsbury et al. |
| 2004/0010473 A1* | 1/2004 | Hsu ................... G06Q 20/085 705/77 |
| 2005/0138628 A1 | 6/2005 | Bradford et al. |
| 2005/0278498 A1 | 12/2005 | Ahluwalia et al. |
| 2007/0183418 A1 | 8/2007 | Riddoch et al. |
| 2008/0005794 A1 | 1/2008 | Inoue et al. |
| 2008/0148291 A1 | 6/2008 | Huang et al. |
| 2009/0006920 A1* | 1/2009 | Munson ................ H04L 1/0017 714/748 |
| 2009/0172674 A1 | 7/2009 | Bobak et al. |
| 2009/0240874 A1 | 9/2009 | Pong |
| 2009/0265723 A1 | 10/2009 | Mochizuki et al. |
| 2010/0017655 A1 | 1/2010 | Gooding et al. |
| 2010/0049876 A1 | 2/2010 | Pope |
| 2010/0118041 A1 | 5/2010 | Chen et al. |
| 2011/0035575 A1 | 2/2011 | Kwon et al. |
| 2011/0083002 A1 | 4/2011 | Albers et al. |
| 2011/0161619 A1 | 6/2011 | Kaminski et al. |
| 2011/0219208 A1 | 9/2011 | Asaad et al. |
| 2012/0036334 A1 | 2/2012 | Horman et al. |
| 2012/0260017 A1 | 10/2012 | Mine et al. |
| 2014/0068636 A1 | 3/2014 | Dupont et al. |
| 2014/0122695 A1 | 5/2014 | Kulikov et al. |
| 2014/0189057 A1 | 7/2014 | Sankoda et al. |
| 2014/0355606 A1 | 12/2014 | Riddoch |
| 2015/0081985 A1 | 3/2015 | Archer et al. |
| 2015/0156122 A1 | 6/2015 | Singh et al. |
| 2015/0261588 A1 | 9/2015 | Liu et al. |
| 2015/0326542 A1 | 11/2015 | Serebrin |
| 2015/0363110 A1 | 12/2015 | Batra et al. |
| 2016/0044143 A1 | 2/2016 | Narasimhamurthy |
| 2016/0103480 A1 | 4/2016 | Sanghi et al. |
| 2016/0103689 A1 | 4/2016 | Sanghi et al. |
| 2016/0226967 A1 | 8/2016 | Zhang et al. |
| 2016/0378545 A1 | 12/2016 | Ho |
| 2017/0003977 A1 | 1/2017 | Sumida et al. |
| 2017/0075856 A1 | 3/2017 | Suzue et al. |
| 2017/0147282 A1 | 5/2017 | Seo |
| 2017/0187621 A1 | 6/2017 | Shalev |
| 2017/0264497 A1 | 9/2017 | Lim |
| 2017/0286322 A1 | 10/2017 | Garg et al. |
| 2017/0337588 A1 | 11/2017 | Chittilappilly |
| 2017/0371591 A1 | 12/2017 | Xia et al. |
| 2018/0004690 A1 | 1/2018 | Kaminski et al. |
| 2018/0295052 A1 | 10/2018 | St-Laurent |
| 2019/0097938 A1* | 3/2019 | Talla ..................... H04L 47/30 |

* cited by examiner

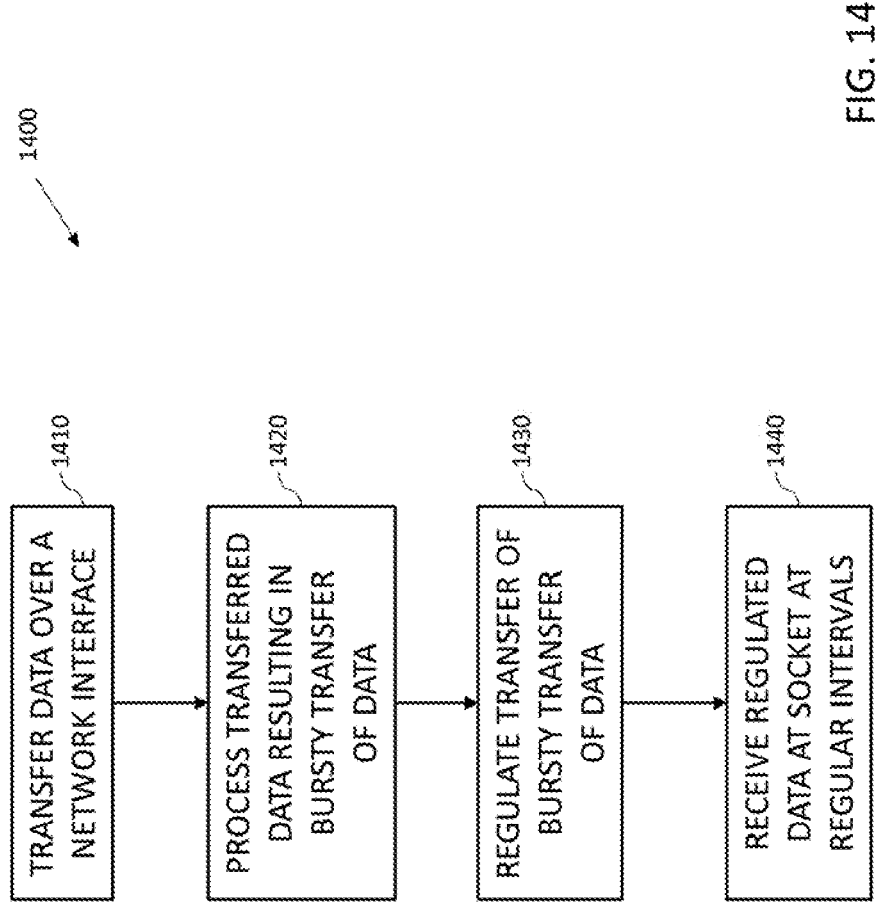

METHODS AND APPARATUS FOR REGULATING NETWORKING TRAFFIC IN BURSTY SYSTEM CONDITIONS

PRIORITY

This application claims the benefit of priority to U.S. Provisional Patent Application Ser. No. 62/649,509 filed Mar. 28, 2018 and entitled "Methods and Apparatus for Efficient Data Transfer within User Space Networking Stack Infrastructures", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

2. DESCRIPTION OF RELATED TECHNOLOGY

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications. Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack. More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

In one aspect, a method for regulating bursty data transferred within a device is disclosed. In one embodiment, the method includes: transferring data over a network interface; processing the transferred data, the processing of the transferred data resulting in a bursty transfer of the data with a first processing apparatus; regulating transfer of the bursty transfer of the data; and receiving the regulated data at a socket, the socket interfacing user space to kernel space.

In one variant, the regulating of the transfer of the bursty transfer of the data includes using a reducing ring buffer for the regulating.

In another variant, the method further includes dynamically setting a reducing rate for the reducing ring buffer, the dynamic setting of the reducing rate being based on channel conditions associated with a network in communication with the network interface.

In yet another variant, the method further includes setting a size of a submission queue to a first size, the first size being larger than a second size, the setting of the first size of the submission queue reducing likelihood that the network will throttle bandwidth associated with the device as compared with the submission queue being set at the second size.

In yet another variant, the method further includes receiving the bursty transfer of the data from the first processing apparatus at a second processing apparatus over a communications link.

In yet another variant, the method further includes transferring a plurality of data over a plurality of differing network interfaces; and individually regulating transfer of the transferred plurality of data to the user space.

In another aspect, a system for regulating bursty data transfers is disclosed. In one embodiment, the system includes a first processing apparatus in signal communication with a second processing apparatus over a communications link; and a non-transitory computer readable apparatus having a storage medium that includes one or more computer programs, the one or more computer programs, which when executed, are configured to: process data received over a network interface, the processing of the received data resulting in a bursty transfer of the received data over the communications link; and regulate transfer of the bursty transfer of the received data to a user space application via one or more sockets.

In one variant, the first processing apparatus includes a baseband processor, the second processing apparatus includes an application processor, and the communication link includes an inter-processor communication link.

In another variant, the regulation of the transfer of the bursty transfer of the received data includes use of a reducing ring buffer, the reducing ring buffer being configured to transfer the received data at regular intervals and at regular sizes.

In yet another variant, the system includes one or more of smartphones, smartwatches, tablets, desktop computers, laptops, phablets, portable media players, and smart home devices.

In yet another variant, the one or more computer programs, which when executed, are further configured to: dynamically set a reducing rate for the reducing ring buffer, the dynamic setting of the reducing rate being based on channel conditions associated with a network in communication with the network interface.

In yet another variant, the processing of the received data includes a block-based packet correction and re-order of the received data.

In yet another variant, the network interface includes a plurality of differing network interfaces, the plurality of differing network interfaces being selected from the group consisting of: a cellular network interface, a Wi-Fi network interface, and a Bluetooth network interface.

In yet another variant, the non-transitory computer readable apparatus further has a plurality of applications stored thereon, the plurality of applications including a first application that implements its communication stack in user space and a second application that implements its communication stack in kernel space.

In yet another variant, the user space application includes the second application.

In yet another aspect, a non-transitory computer readable apparatus is disclosed. In one embodiment, the non-transitory computer readable apparatus includes a storage medium having one or more computer programs stored thereon, the one or more computer programs, which when executed, are configured to: receive data from a network interface; process the received data, the processing of the received data resulting in a bursty transfer of the received data from a first processing apparatus; regulate transfer of the bursty transfer of the received data to a user space application; and receive the regulated data at a socket, the socket interfacing user space with kernel space.

In one variant, the regulation of the transfer of the bursty transfer of the received data is accomplished via use of a reducing ring buffer.

In another variant, the one or more computer programs, which when executed, are further configured to: dynamically set a reducing rate for the reducing ring buffer, the reducing rate being based on channel conditions associated with a network in communication with the network interface.

In yet another variant, the one or more computer programs, which when executed, are further configured to: set a size of a submission queue to a first size, the first size being larger than a second size, the setting of the first size of the submission queue reducing likelihood that the network will throttle bandwidth sent to a device as compared with the submission queue being set at the second size.

In yet another variant, the processing of the received data comprises a block-based packet correction and re-order of the received data.

In yet another variant, the non-transitory computer readable apparatus includes a plurality of applications that are stored thereon, the plurality of applications including a first application that implements its communication stack in user space and a second application that implements its communication stack in kernel space.

In yet another aspect, an integrated circuit (IC) device for implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed.

In yet another aspect, a software architecture for implementing one or more of the foregoing aspects is disclosed and described.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 14 is a logical flow diagram illustrating a generalized method for using the system of, for example, FIGS. 12-13, in accordance with various aspects of the present disclosure.

All figures © Copyright 2017-2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While embodiments are primarily discussed in the context of use in conjunction with an inter-processor communication link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "Methods and Apparatus for Control of a Jointly Shared Memory-Mapped Region", each of which being incorporated herein by reference in its entirety, it will be recognized by those of ordinary skill that the present disclosure is not so limited. In fact, the various aspects of the disclosure are useful in any device or network of devices that experiences head-of-line blocking due to sequential delivery requirements for packets, as is disclosed herein.

Existing Network Socket Technologies—

Figure 1:
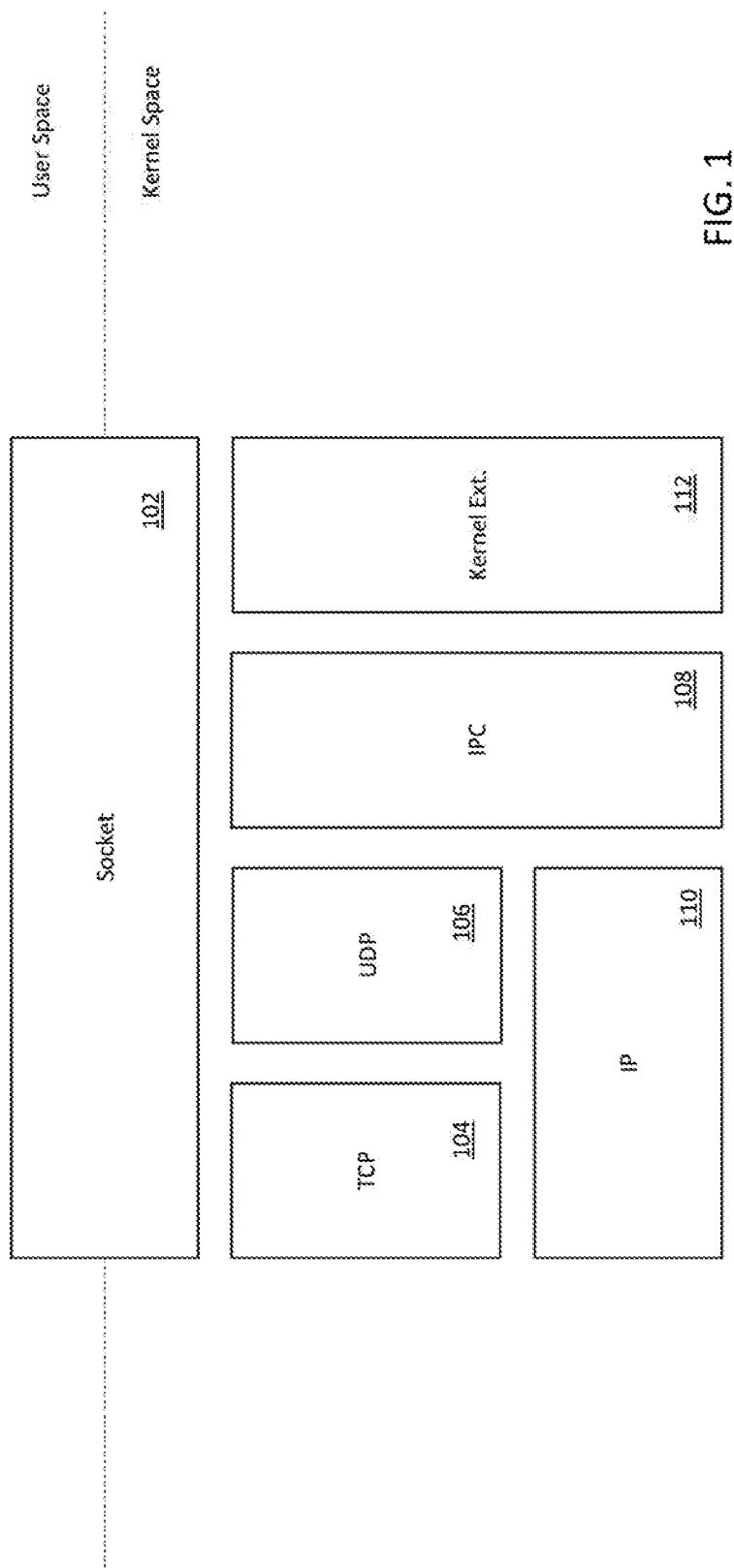
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Process Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel. As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Process Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndry (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel). Unfortunately, $3^{rd}$ party kernel extensions can be dangerous and/or undesirable.

As previously noted, software applications are restricted for security and stability reasons; however the kernel is largely unrestricted. A $3^{rd}$ party kernel extension can introduce instability issues because the $3^{rd}$ party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies—

Figure 2:
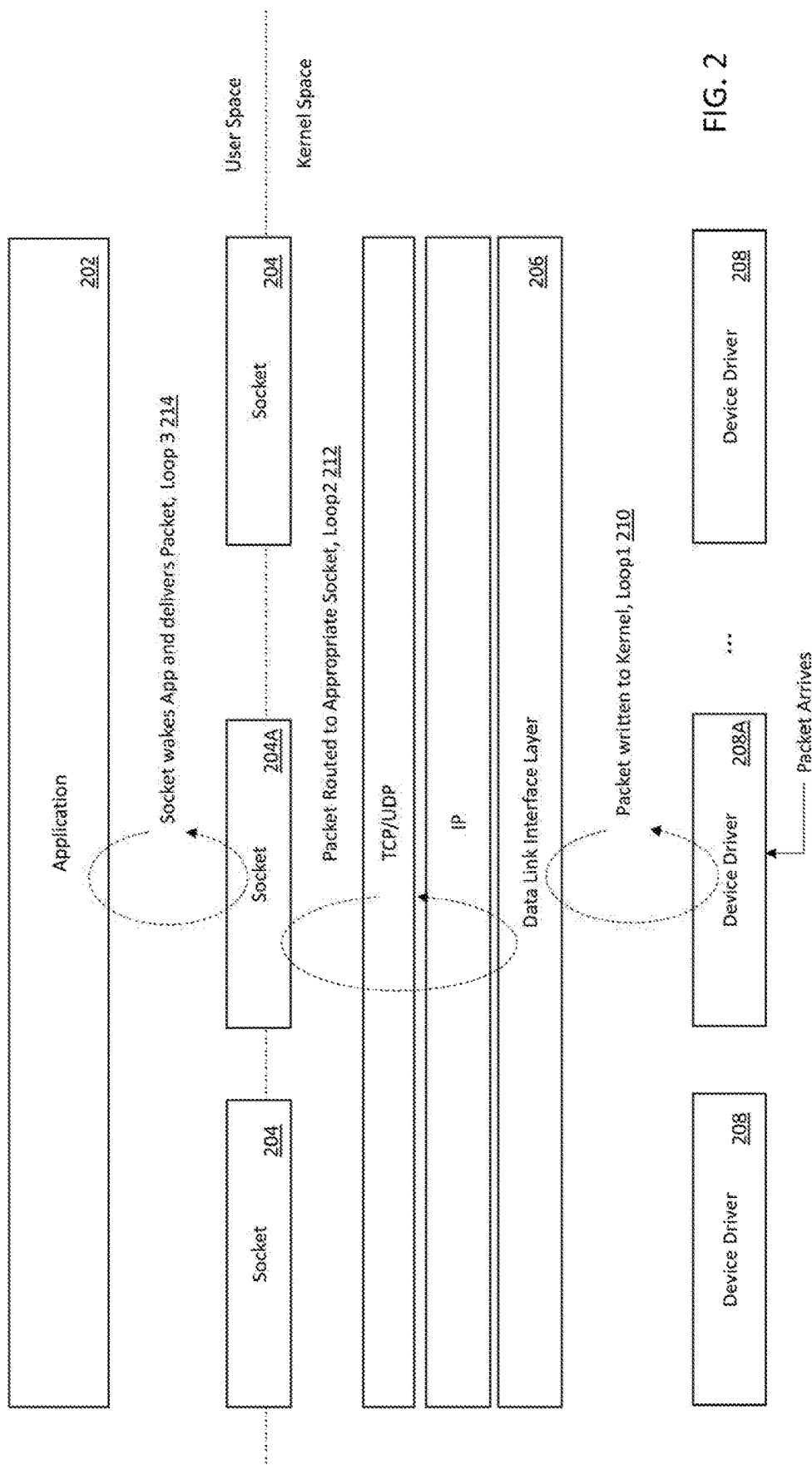
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases—

Figure 3:
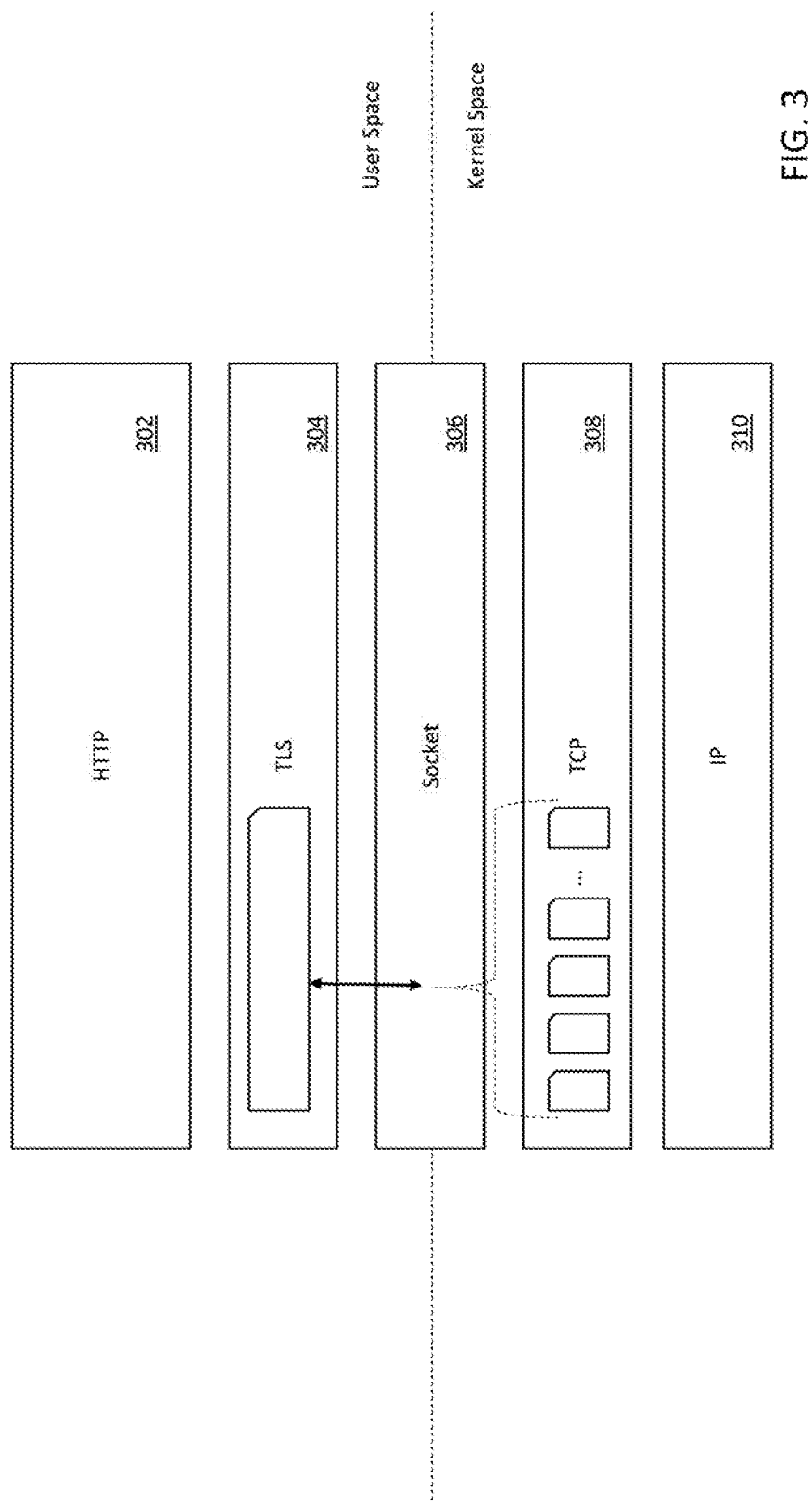
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
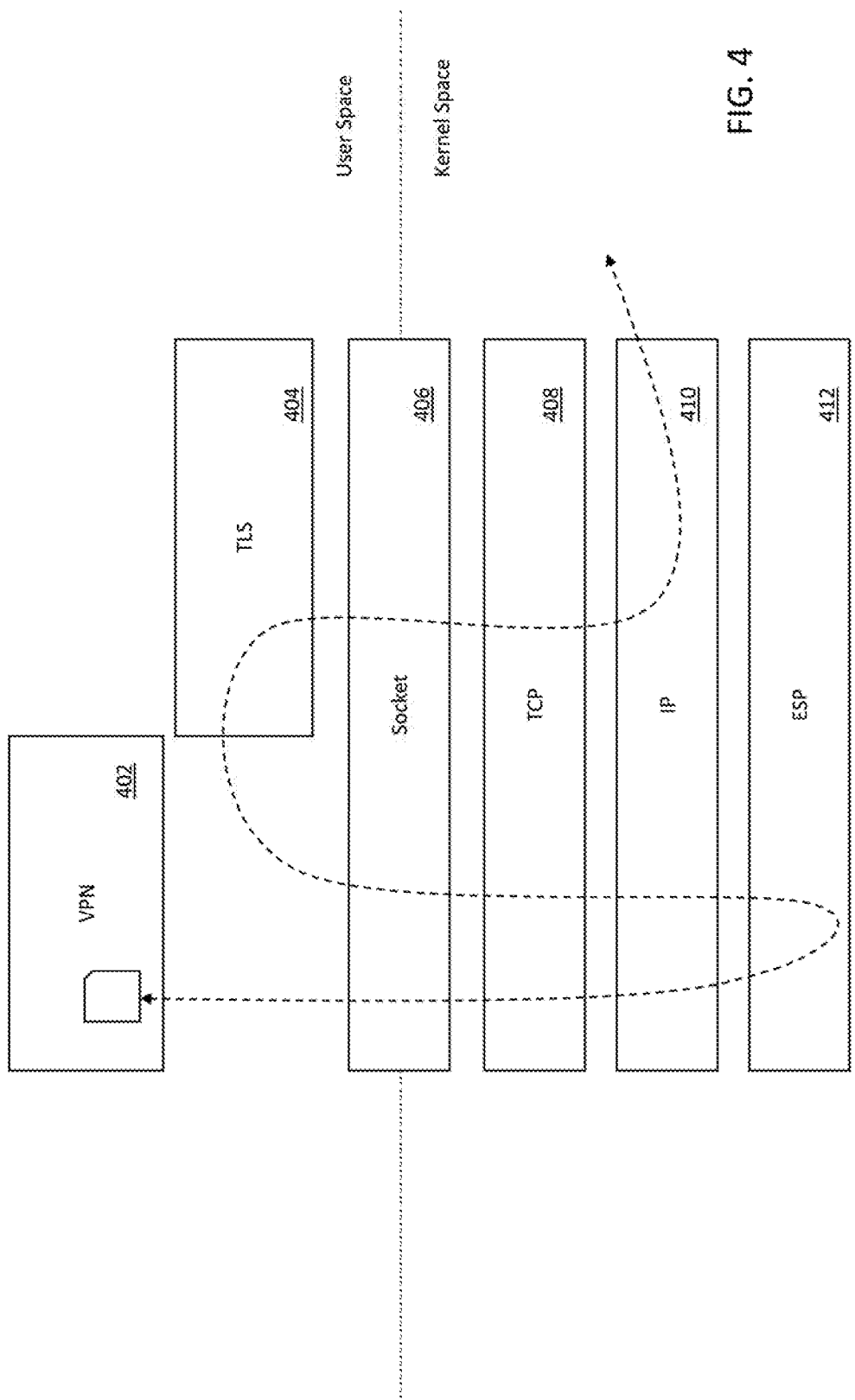
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
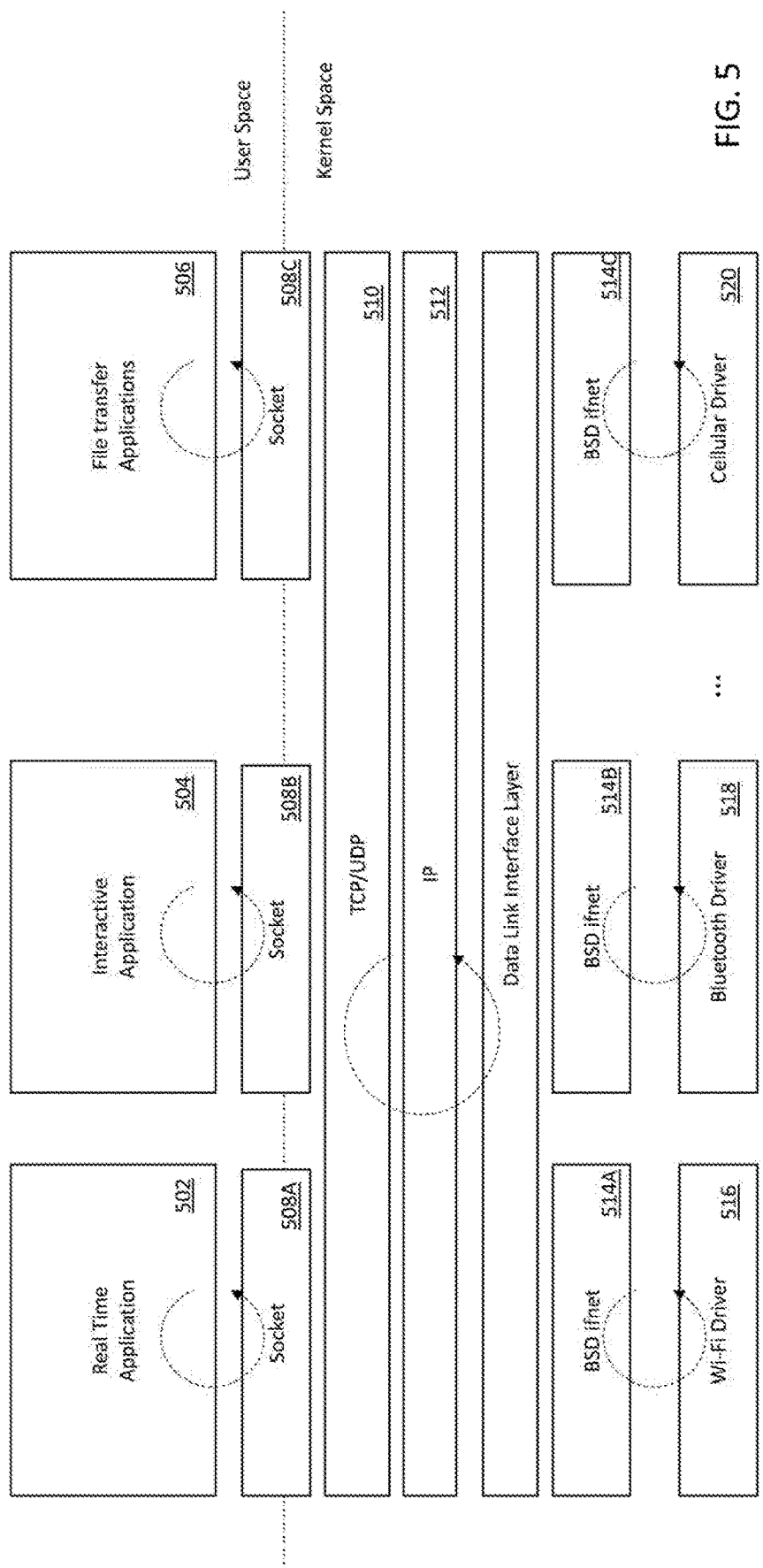
FIG. 5 is a logical block diagram of an exemplary implementation of application based tuning, useful for explaining various aspects of the present disclosure.

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multithreaded operation. As shown therein, the exemplary multithreaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multithreaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary Networking Architecture—

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or daemon. In some cases, the user space architecture can expose low-level networking interfaces to transport protocols and/or encapsulation protocols such as UDP, TCP, and QUIC; and enable network protocol extensions and rapid development cycles.

Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
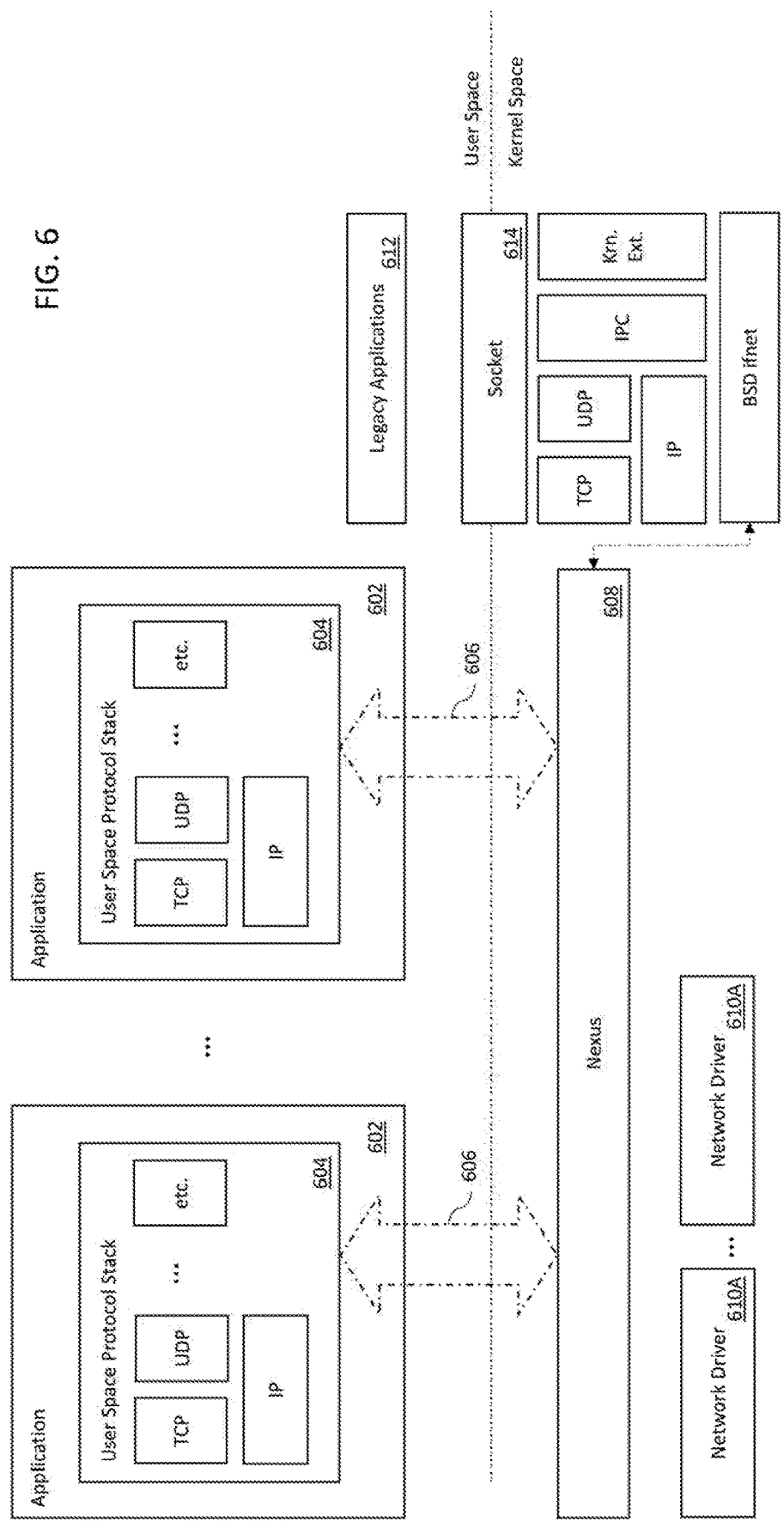
FIG. 6 is a logical representation of an exemplary networking stack architecture, in accordance with the various aspects of the present disclosure.

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary I/O Infrastructure—

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.)

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus—

In one exemplary embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one exemplary embodiment, the nexus 608 may additionally ensure that there is fairness and/or appropriately prioritize each of its connected stacks. For example, within the context of FIG. 6, the nexus 608 balances the network priorities of both the existing user space protocol stacks 604, as well as providing fair access for legacy socket based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see *Protocol Unloading and Offloading*, discussed infra).

Exemplary Network Extensions—

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations—

In one exemplary optimization of the present disclosure, the nexus includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch nexus instance. For example, as previously noted, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading—

In the foregoing discussions, the improvements to user space operation may be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance.

As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded. For example, consider Address Resolution Protocol (ARP) request handling;

when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack—

Figure 7:
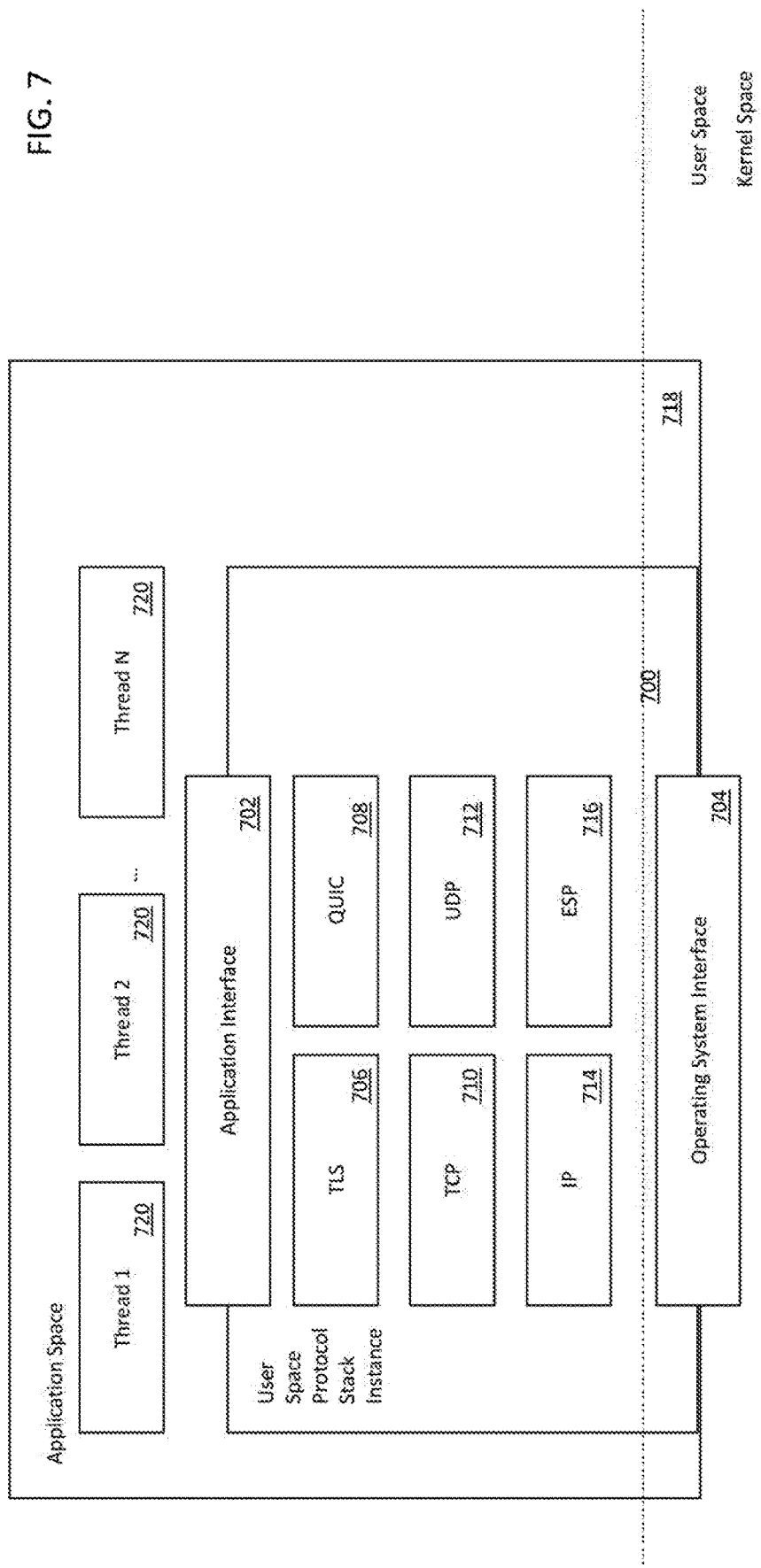
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution.

More directly, only one thread can access the user space networking stack 700 at a time; consequently, kernel locking is entirely obviated by the user space networking stack.

Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation—

Figure 8:
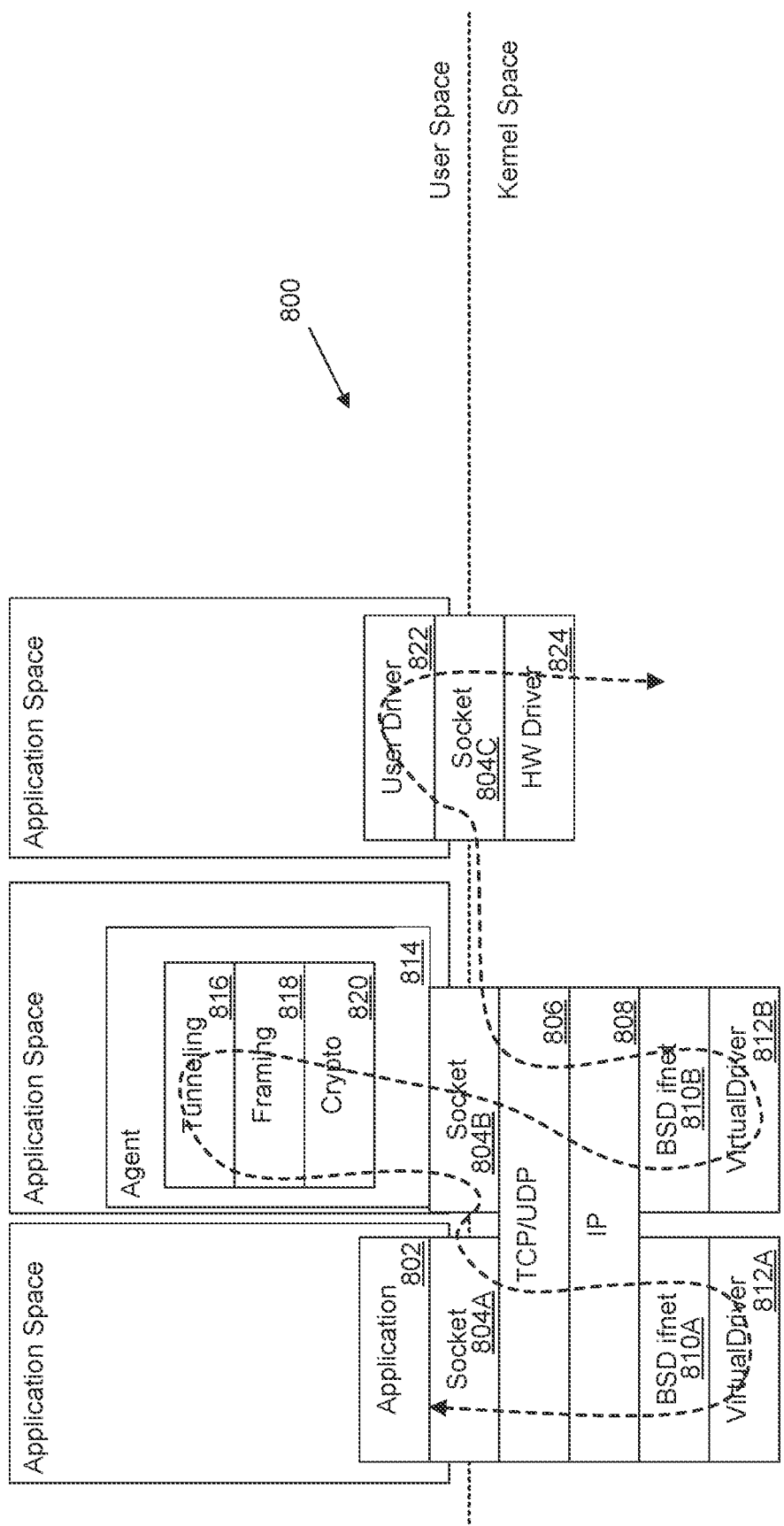
FIG. 8 is a logical flow diagram useful to summarize the convoluted data path taken for a prior art application using a proxy agent application within the context of the traditional networking stack, useful for explaining various aspects of the present disclosure.

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

Figure 9:
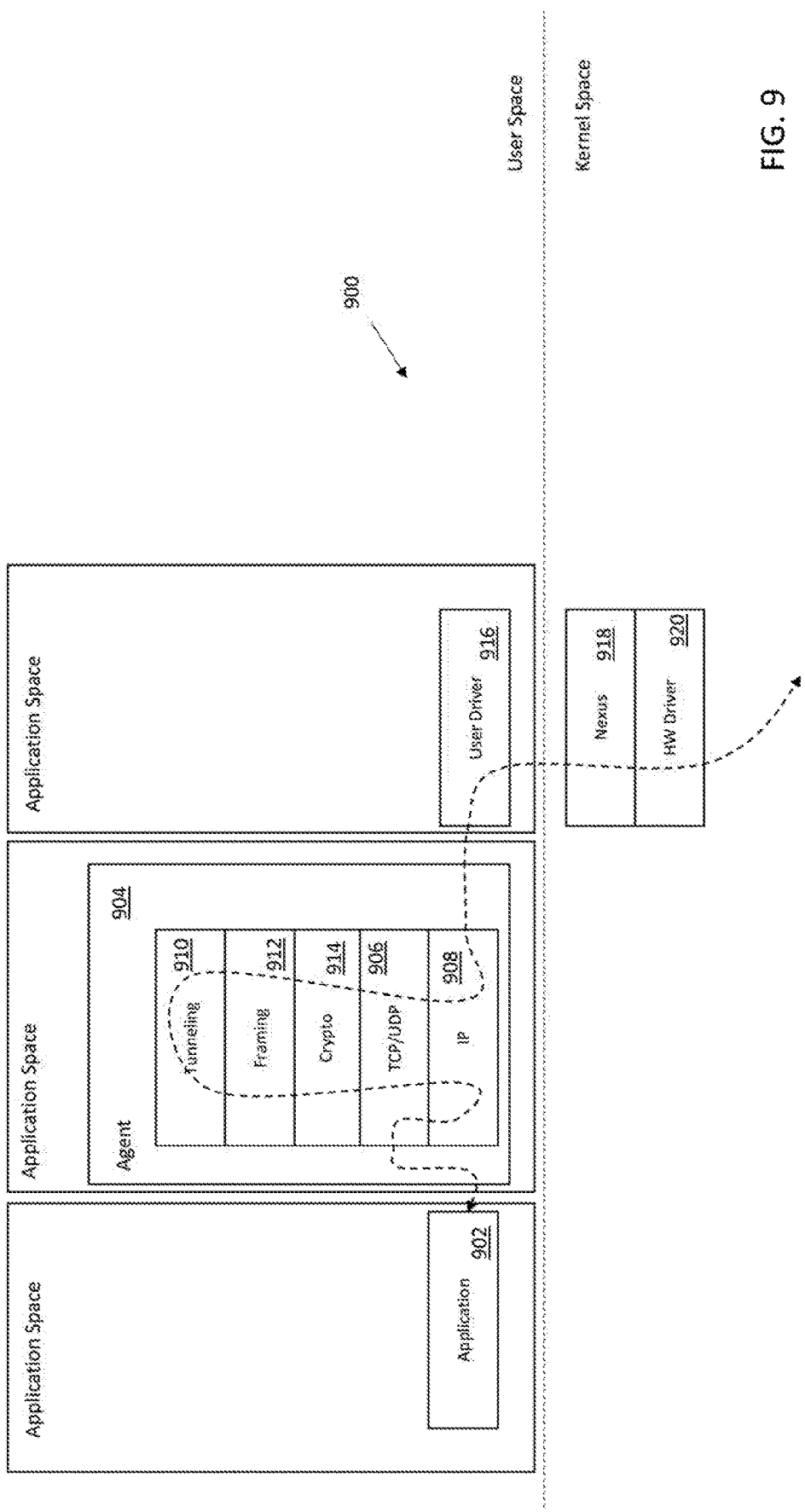
FIG. 9 is a logical flow diagram useful to summarize an exemplary proxy agent application within the context of the user space networking stack, in accordance with various aspects of the present disclosure.

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with nexus 918 for the one (and only) domain crossing into kernel space. Thereafter, the nexus 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

Existing Data Link Layer Operation—

Figure 10:
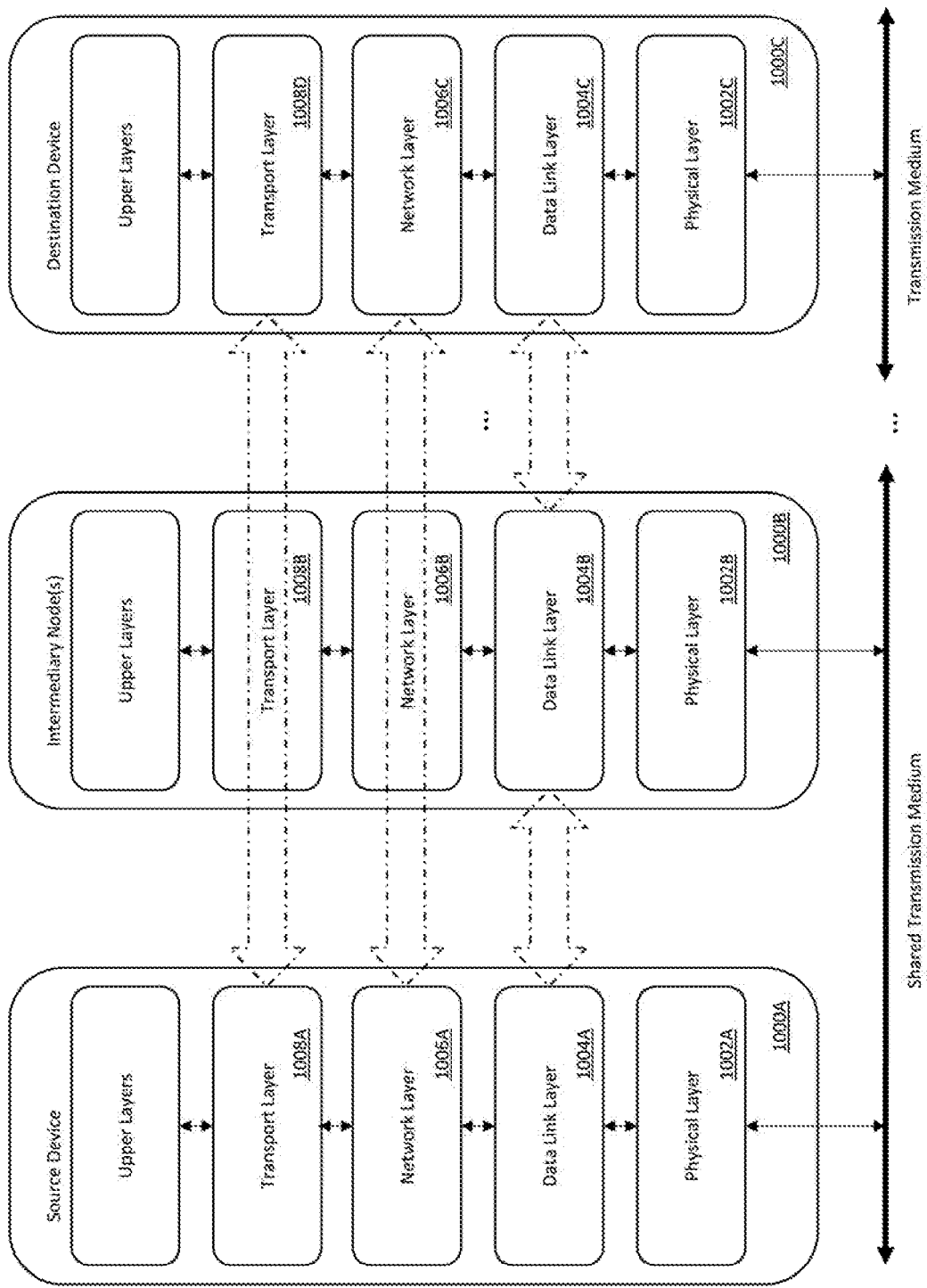
FIG. 10 is a graphical representation of the Open System Interconnection (OSI) model, useful for describing data link layer operation.

FIG. 10 is a graphical representation of the Open System Interconnection (OSI) model (e.g., a legacy BSD stack), useful for describing existing data link layer operation. The OSI model is commonly used within the related arts to describe the communication functions of a telecommunication or computing system in a parlance that is agnostic to the underlying internal structure and technology. The model originally defined seven (7) layers: the physical layer, data link layer, network layer, transport layer, session layer, presentation layer, and application layer. Most practical implementations use only a subset of the originally defined layers; FIG. 10 illustrates only the physical layer 1002, data link layer 1004, network layer 1006, and transport layer 1008; the upper layers are shown for reference but for conciseness and clarity are not discussed further.

Each layer of the OSI model corresponds to functions that are performed within the hardware, firmware, or software of a network device. During operation each layer serves the layer "vertically" above it, and is served by the layer "vertically" below it. For example, the data link layer may enable error-free communications across a network, and provides the link for the network layer above it, while it calls the physical layer to send and receive packets. Additionally, each layer communicates with a corresponding peer layer "horizontally" within one or more peer network device(s).

For example, as shown in FIG. 10, the data link layer 1004A of a source device 1000A may negotiate medium access control with a peer data link layer 1004B of an intermediary node device 1000B; the data link layer 1004A of the source device 1000A thereafter controls the physical layer 1002A of the source device 1000A in accordance with the negotiated access control. Similarly, the network layer 1006A of the source device 1000A can address network layer packets to the network layer 1006C of the destination device 1000C; notably, the network layer 1006B of the intermediary node device 1000B will receive the network layer packets from the source device 1000A, and can route the network layer packet to the appropriate destination device 1000C.

As used herein, a "node" may refer to a logical termination, routing, and/or rerouting point of a communication link. A node is capable of receiving, transmitting, creating, and/or consuming data from a communications link. For example, a source node creates data for consumption at a destination node. The data may be transmitted to, and routed between intermediary nodes. Entities that only passively affect a communication link are not nodes; for example, a wire or a passive patch point (a manual switch junction) is not a node.

In slightly greater detail, the physical layer 1002 is the first layer of the OSI model, which is directed to transmission technologies of a network. More directly, the physical layer 1002 defines how raw bits of data are transmitted over a physical data link connecting network nodes. For example, the bit stream may be grouped into symbols and converted to a physical signal (e.g., electrical, optical) that is transmitted over a transmission medium (e.g., wires, fiber). The physical layer 1002 encompasses the electrical, mechanical, and procedural interface to the transmission medium.

The data link layer 1004 is the second layer of the OSI model. The data link layer 1004 sits between the physical layer 1002 and the network layer 1006. Functionally, the data link layer 1004 enables transfers of data between adjacent network nodes by formatting network layer packets of data into frames (or data link layer packets) for transmission (e.g., encapsulation of data within sequential frames), and medium access control (MAC) e.g., arbitration of control of shared transmission medium. The data link layer 1004 may also include functions for flow control, acknowledgment, error notification, error detection, and/or correction of errors that occur in the physical layer 1002.

For example, during data link layer 1004 operation, network layer data packets are "encapsulated" within data link layer frames for transmission to an adjacent network node on a shared transmission medium. During the encapsulation process, the network layer data packet is partitioned into appropriate size "chunks" (if necessary). A frame header and trailer may be added to each chunk. The frame header includes a start of frame delimiter (SFD), destination and source medium access control (MAC) address, and length (when a stop frame delimiter is not used). The frame trailer may include a frame check sequence (e.g., a 32-bit cyclic redundancy check (CRC) used to detect any in-transit corruption of data) and a stop frame delimiter (when length is not used).

The network layer 1006 is the third layer of the OSI model. The network layer 1006 manages network layer packet forwarding and routing via intermediate network nodes, thereby enabling transfer of network layer packets from a source to a destination address. The network layer 1006 provides connection-less connectivity; in other words, each network layer packet is individually addressed and routed based on information carried in each network layer packet. The network layer functionality does not span multiple packet transfers.

For example, during network layer 1006 operation, transport layer data packets are "encapsulated" within network layer packets for transmission from a source node to a destination node. The network layer encapsulation identifies a destination and source Internet Protocol (IP) address and length. The network layer encapsulation also includes a header checksum (e.g., a 16-bit cyclic redundancy check (CRC).

The transport layer 1008 is the fourth layer of the OSI model. The transport layer 1008 may provide endpoint-to-endpoint communication guarantees, thereby enabling the endpoints to establish a persistent connection over multiple packet transfers via the underlying network(s). This can include guarantees regarding reliability, error recovery, re-transmission, flow control, and/or multiplexing. The communication guarantees may vary widely in complexity and functionality; for example, TCP provides reliable, ordered, and error-checked delivery of a stream of octets (bytes) between applications. In contrast UDP provides a connectionless datagram service that emphasizes reduced latency over reliability.

During transport layer 1008 operation, two or more endpoints establish a persistent connection between themselves (a virtual circuit). Once the connection is established, the endpoints may transfer data by encapsulating application data within transport layer packets for transmission from a source "port" to a destination "port". The application data may be associated with a sequence number for ordering/re-ordering. After the persistent data transfer, the connection may be closed.

As used herein, the term "packet" as used herein may refer generically to a basic unit of communication over a digital network. A packet may also be called a datagram, a segment, a block, a cell or a frame, depending on the protocol used for the transmission of data. However, "transport layer packets", "network layer packets", and "data link layer packets" refer to different types of packets that have specific characteristics. Explicit references to e.g., "transport layer packets", "network layer packets" and "data link layer packets" are used where the specific characteristics or aspects of the packet type are appropriate.

A "data link layer packet" or a "layer 2 (L2) packet" (also commonly referred to as a "frame") may refer to a container for data to deliver information, called the payload, between two adjacent nodes on a shared transmission medium. Ethernet frames are one example of data link layer packets; the source and destination address of an Ethernet frame are the MAC (medium access controller) address of a network node. While a MAC address is an identification number that is unique to every Ethernet device in the entire world, generally speaking the data link layer address and/or connectivity only needs to be unique for the shared transmission medium. Similarly, Ethernet frames include a start of frame delimiter (SFD) and length or stop of frame delimiter; the data link layer sequencing information need only be unique within the shared transmission medium.

"Network layer packets" or "layer 3 (L3) packets" may refer to a container for data with network addresses that can traverse different networks, typically via intermediary "hops" between different network nodes and/or network routers. Routers can connect small networks together for information exchange on a much larger scale using e.g., Internet Protocol (IP) network addresses for packet forwarding instead of MAC addresses. For example, a source device from a first network can transmit data to a destination device on a cellular network via e.g., a local router that delivers the data to an Internet backhaul that, in turn, routes the data to the appropriate cellular network for delivery. Unlike data link layer packets, network layer packets are not limited to adjacent nodes on a shared transmission medium; in fact, network layer packets can traverse different transmission mediums via the aforementioned routers. While both the network and data link layer uses addressing schemes, the IP and MAC addresses vary significantly in scope.

Similarly, "transport layer packets" or "layer 4 (L4) packets" may refer to containers for sequentially ordered data that provide a continuous application data stream between endpoints of the communication network. In other words, transport layer packets virtualize a continuous circuit connection in time over the underlying network connection. While both data link layer packets and transport layer packets are sequentially ordered, data link layer packets are only sequentially ordered within the context of its adjacent connectivity. In contrast, transport layer packets are sequentially ordered within the context of the endpoints (which may span multiple different networks). For example, while the start of frame delimiter/length and a TCP frame sequence number both convey sequence, they vary significantly in scope.

Artisans of ordinary skill in the related arts will recognize that prior art implementations of the OSI model require that each layer be an "abstraction layer" i.e., each layer may "hide" or isolate its functions and operation from the other layers. In the computing arts, "abstraction layers" are used to facilitate interoperability and platform independence. For example, while a network layer 1006 may rely on error correction mechanisms provided by the data link layer 1004, the network layer 1006 is unaware of, and cannot control, how such error correction is performed. Abstraction layers enable peer layers of peer devices to communicate using common protocols with one another; each peer layer separately relies on their underlying layers to manage the lower layer functionality (that vary based on technology and implementation).

While abstraction enables different devices and networks to interoperate with one another via different network conditions and capabilities, it also inherently hides each node's operational considerations (environment, capability, functionality, etc.) from its peer nodes. Historically, each network node was a distinct device. However, modern devices use multiple independently operable processors (e.g., an application processor and a baseband processor), each of which operates as a separate network node. Unfortunately, the abstraction layers within a single device can be problematic. For example, a baseband node (e.g., a peripheral processor) can process data in large bursts, that when forwarded to the application processor, overruns the application processor's communication stack.

Figure 11A:
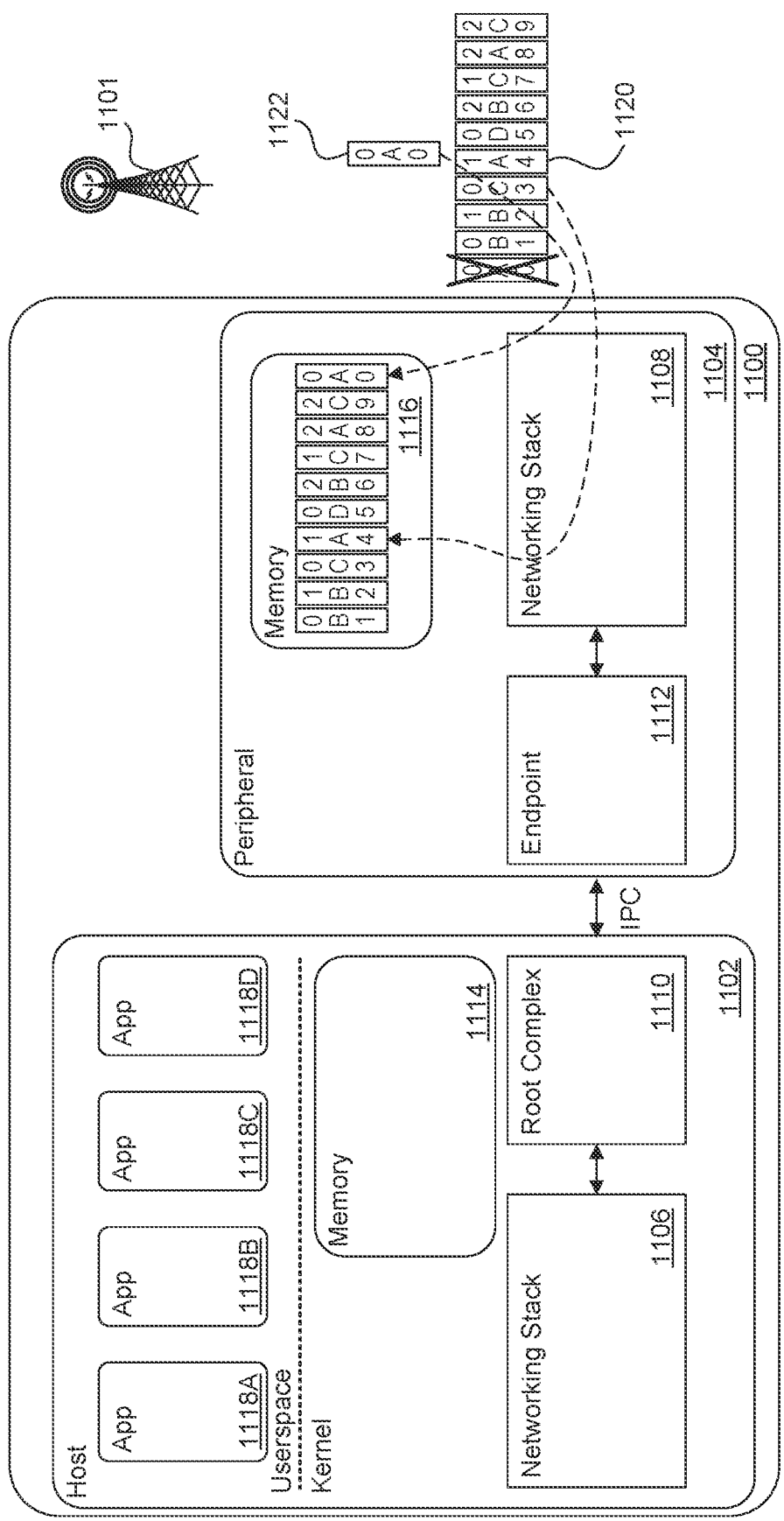
FIGS. 11A-11C are logical representations of an exemplary prior art apparatus, useful for explaining prior art packet delivery schemes.
Figure 11B:
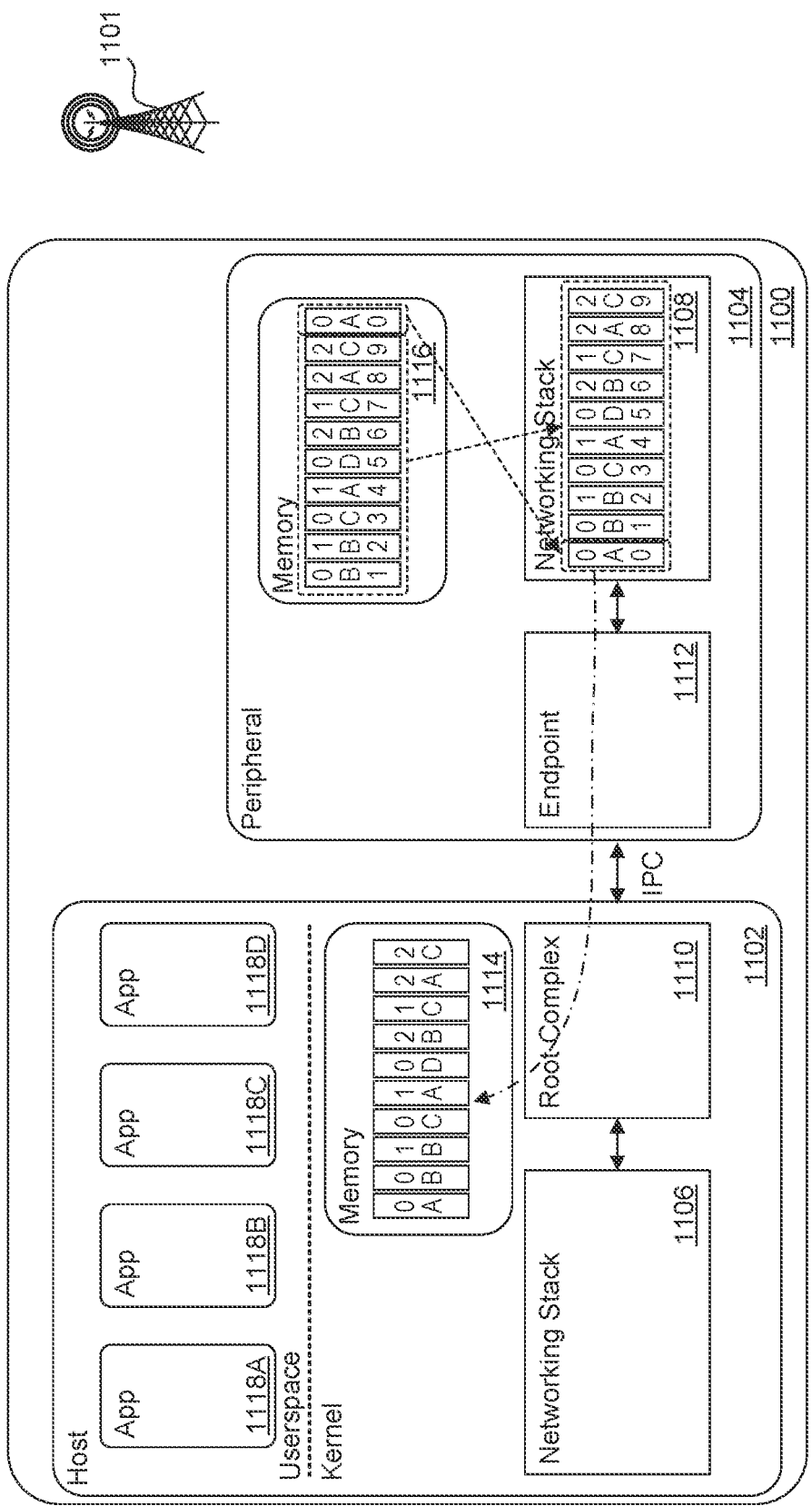
Figure 11C:
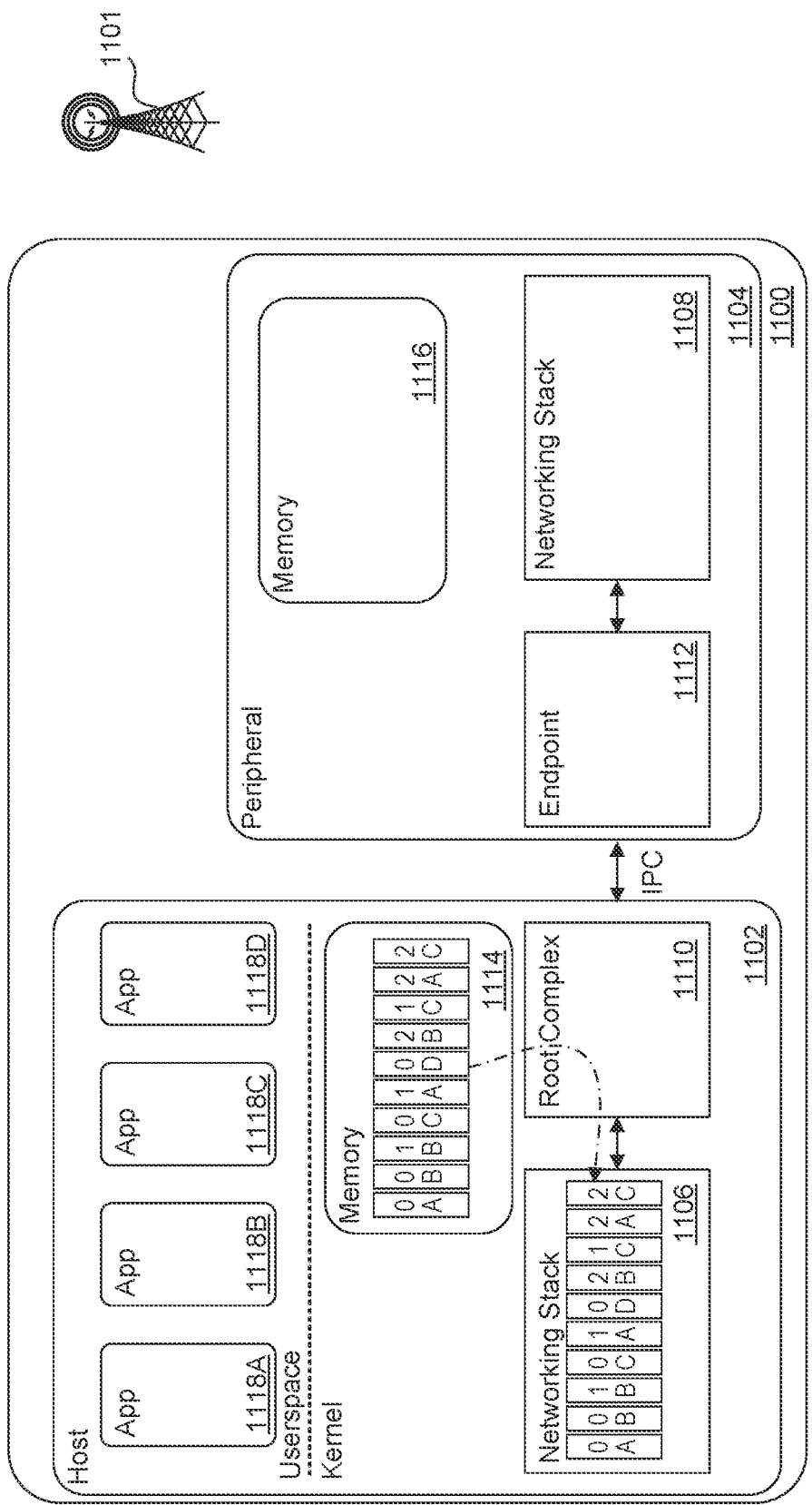

FIGS. 11A-11C are logical representations of an exemplary prior art apparatus, useful for explaining prior art packet delivery. Such schemes are commonly employed within e.g., cellular baseband modems.

As used herein, the term "transmit", "receive", "transmission" and "reception" generically refer to techniques for sending, passing, and receiving data. For example, consider a mobile device in communication with a cloud based service; the mobile device "transmits" and "receives" data with the cloud based service. As used herein, the term "delivery" may refer to the transfer of data from one communication layer to its peer communication layer or an immediately adjacent layer within its own stack. For example, consider a mobile device having a modem and application processor that are coupled via an inter-processor communications link; the modem's data link layer "delivers" data link layer packets to an application processor's data link layer. Similarly, the modem's data link layer "delivers" network link layer packets to its own network link layer, etc.

The following discussions will be described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality, or that such roles cannot be reversed.

As used herein, a "processor" may refer to any logic or circuitry that responds to and processes computer-readable instructions that are stored within, for example, a non-transitory computer-readable medium, e.g., a memory.

The inter-processor communication protocol may be based on a "shared" memory interface for run-time processing (i.e., the independently operable processors each share, either virtually or physically, a common memory interface). In one such embodiment, the shared memory interface provides a multi-channel inter-processor communication link for high throughput transfers. The shared memory interface remains functional when any one of the independently operable processors is active, even when one or more of the remaining independently operable processors are asleep, powered down, powered off, etc.

As used herein, the term "independently operable processor" refers to a processing system having one or more of the processor clock domain, processor power domain, processor code base, arithmetic units, registers, and/or memory, capable of being isolated to allow the processor to operate without other processors in the processing system.

As shown in FIG. 11A, a user device 1100 is in data communication with a wireless network 1101. Common examples of user devices include without limitation smartphones, smartwatches, tablets, laptops, phablets, portable media players, smart home device (including use in conjunction with the so-called Internet of things (IoT)), and other mobile devices that have become ubiquitous in everyday life. The user device 1100 includes a host processor 1102 for the kernel (operating system (O/S)) and applications 1118, and a peripheral processor 1104 for communicating with a wireless network 1101. The host processor executes a network communications stack 1106 from the kernel, which communicates with the peripheral processor's communication stack 1108, via an inter-processor communication link, with an inter-processor communication root complex (RC) 1110 and endpoint (EP) 1112. The host processor has a memory 1114 for storing packet data received from the peripheral processor during transit. The peripheral processor has a memory 1116 for storing packet data received from the wireless network 1101 during transit.

For the purposes of clarity, in the following example, each illustrated data packet corresponds to one (1) data link layer packet encapsulating one (1) network layer packet, further encapsulating one (1) transport layer packet. As shown, each of the illustrated data structures includes the corresponding layer information of the packet; e.g., a data link layer (L2) sequence (denoted in the range 0-9), and an L4 header that includes a L4 port (denoted in the range A-D), and an end-to-end L4 sequence (denoted in the range 0-2). For reasons discussed in greater detail infra, the network layer address may also be considered part of the L4 header. Notably, each L4 port data interface is associated with a single L3 address, and an associated running sequence number L4. Thus, the combination of L3 address information (A-D) along with L4 sequence information (0-2), uniquely identifies a single packet payload. As a practical matter, since L3 network addresses are routed to L4 port numbers and L4 sequence numbers are virtually always used together, the combination of L4 port numbers and L4 sequence number is also commonly referred to as an "L3/L4 packet" (common examples include e.g., TCP/IP packet, etc.) For example, consider a data link layer packet which is sent between adjacent data link nodes at sequence order 9; as shown, this "L2 packet" corresponds to an "L3 packet" or "L4 packet" that is addressed to L4 port C with an endpoint-to-endpoint sequence number of 2.

Artisans of ordinary skill in the related arts will readily appreciate that the foregoing 1:1:1 mapping is purely illustrative; during practical operation, packets of a first layer will span a multiple or a subset of packet of a second layer e.g., the packet mapping may be X:Y:Z. Thus, a data link layer (L2) packet may contain single, partial, or multiple network layer (L3) packets; similarly, even though L3/L4 packets are typically 1:1, other implementations may map a single network layer packet (L3) to single, partial, or multiple transport layer (L4) packets. While the present disclosure is directed to a specific hierarchy of layers, artisans of ordinary skill in the related arts given the contents of the present disclosure will readily appreciate that the various aspects described herein may be applicable to technologies that are not so constrained.

During prior art operation, the peripheral processor 1104 receives data packets 1120 over-the-air from the wireless network at a first time ($t_0$). The peripheral processor 1104 networking stack 1108 stores the data link layer (L2) packets within memory 1116. As shown, data link layer packet 0 is lost during an initial transfer. The networking stack 1108 identifies the missing data link layer (L2) packet and requests a re-transmission at a subsequent time ($t_1$); the peripheral processor 1104 must wait until it receives the missing data link layer (L2) packet. The base station receives the re-transmission request and re-transmits the corrupted data link layer (L2) packet at re-transmission time ($t_2$) 1122. Once the peripheral processor 1104 has received the re-transmission of data link layer 0 at re-transmission time ($t_2$) 1122, the peripheral processor 1104 can re-order the received data packets.

Referring now to FIG. 11B, once all of the data link layer (L2) packets have been received, the networking stack can re-order the data link layer (L2) packets properly, thereafter the network layer (L3) packets can be parsed. The networking stack 1108 determines the destination address of the network layer (L3) packets (based on the network address information of the network layer (L3) packets; these addresses correspond to applications 1118) and routes the network layer (L3) packets to the next "hop" i.e., networking stack 1106. The network layer (L3) packets are transferred via the inter-processor communication link (e.g., endpoint 1112 and root complex 1110), and written into host memory 1114 (e.g., DRAM).

In FIG. 11B, the over-the-air L2 information is removed. While not expressly shown, it is appreciated that the inter-processor communication link performs its own communication stack and delivery (e.g., the inter-processor communication protocol provides an L2 link between the application processor and the baseband). For example, the root complex 1110 and endpoint 1112 also perform formatting, parsing, and may additionally provide similar functionality as to error-free delivery, (e.g., the inter-processor communication protocol may implement similar re-transmission schemes if necessary.)

At FIG. 11C, once the data has been successfully transferred into host memory 1114, the host processor can parse the data with its networking stack 1106. Specifically, the networking stack 1106 can parse the data packets to extract the relevant network layer (L3) address and transport layer (L4) sequence. The payloads are provided to their respective applications 1118A, 1118B, 1118C, and 1118D based on the network layer address, and in the transport layer sequence. As used herein, the term "parse" and "parsing" may refer to the process of dividing a data structure of data objects (such as a string or array of symbols) into its constituent data objects. For example, in this case, the data stored in host memory 1114 is parsed for network layer addressing and transport layer sequence.

The prior art packet delivery scheme re-uses existing well-understood network protocols, software, and hardware and provides reliable delivery. However existing solutions suffer from a number of problems. For instance, as expressly shown in FIGS. 11A and 11B, if one or more data link layer (L2) packets between the modem and the wireless network are missing or otherwise corrupted (i.e., a "hole" in the data link layer sequence), then the modem waits to process the network layer and/or transport layer data packets until after the missing data link layer packet is received.

Within the context of certain implementations (such as the aforementioned inter-processor communication bus technology), the high throughput burst data delivery of the system 1100 is undesirable. For example, some host networking stacks are not capable of handling large data transfers; this can result in overflow conditions (e.g., user datagram protocol (UDP) socket buffer overruns). Additionally, these existing BSD network stacks were often designed for wired connectivity, and as a result, legacy BSD sockets (e.g., BSD socket receive buffers) are too small to handle these large bursts of data (e.g., less than 192 KiloBytes (KB)), and do not expect such intermittent connectivity (e.g., the connection may timeout). In other words, the kernel may not be able to push data through the socket into the user space application. As a related consequence, the wireless network itself may throttle down on link capacity to devices that are internally bottlenecked to better serve non-bottlenecked devices. Such throttling is obviously undesirable for manufacturers of these cellular devices as a user's perception will be that the cellular device is "slow". Accordingly, solutions are needed which address the foregoing deficiencies.

Using RX Mitigation and RX Ring Size to Normalize Packet Flow in Bursty Networking Conditions—

The present disclosure addresses the use of, for example, legacy BSD stacks that may be supported in parallel with user space networking architectures as was described supra. As is discussed subsequently herein with respect to, for example, FIGS. 12 and 13, mechanisms are described which enable the "smoothing" of high bursts of intermittent data into "non-bursty" data, thereby remaining within legacy BSD socket limitations (e.g., 192 KB buffer sizes). Implementations of the present disclosure may dynamically set a "reducing rate" based on, for example, channel conditions or other application considerations. For example, implementations described herein enable the balancing of data throughput, take into account latency considerations, processing complexity, and/or quality of service considerations. These and other implementations would be readily apparent to one of ordinary skill given the contents of the present disclosure.

Figure 12:
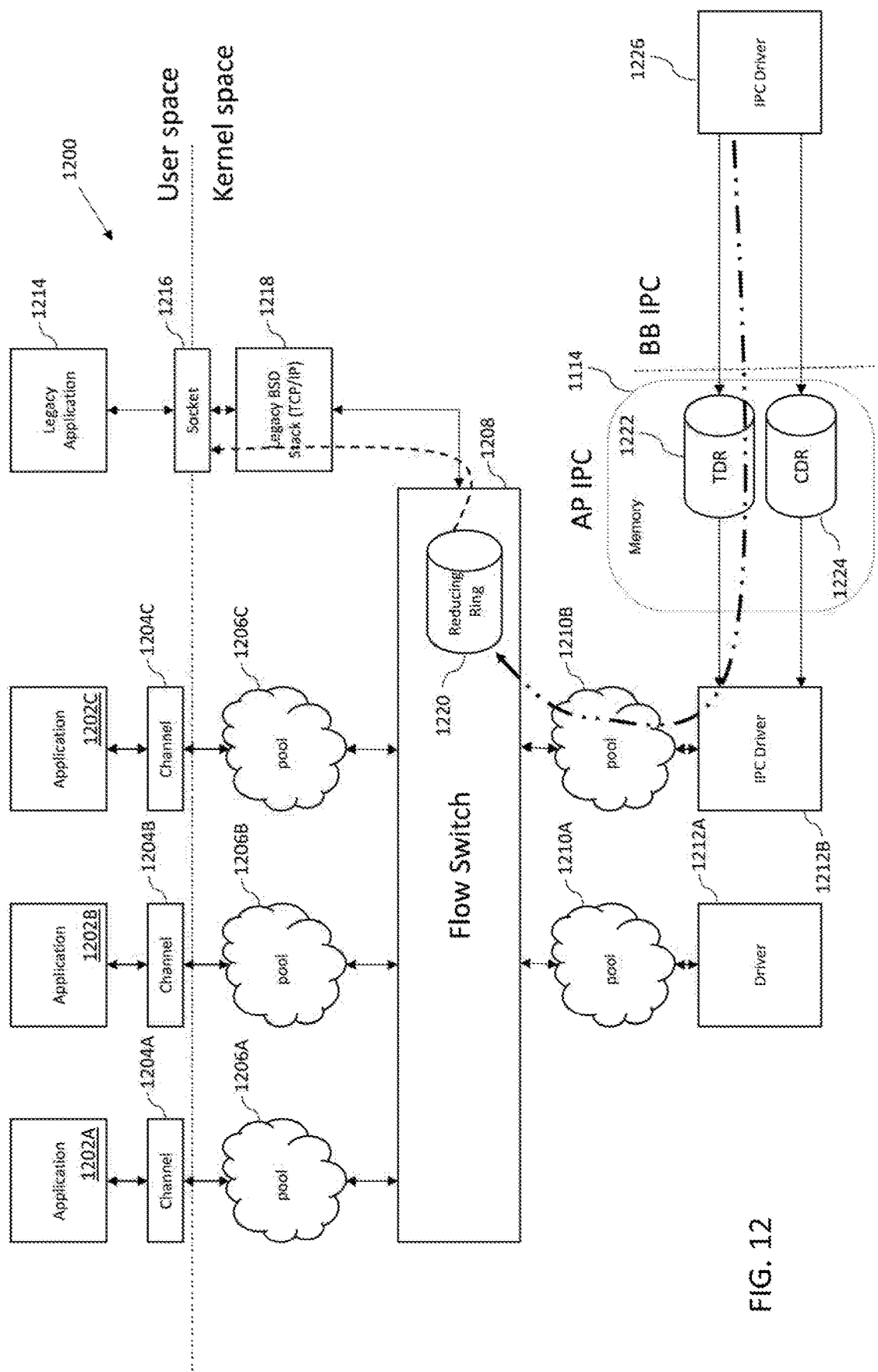
FIG. 12 is a logical representation for a system of managed pool resources that normalize packet flow in bursty communications, in accordance with various aspects of the present disclosure.

Referring now to FIG. 12, one exemplary implementation of a system 1200 for use in accordance with embodiments of the present disclosure is now shown and described in detail. This exemplary system 1200 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein. As used herein, the term "processing apparatus" or "processor" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

While a specific architecture is shown in FIG. 12, it would be readily apparent to one of ordinary skill given the contents of the present disclosure that the illustrated topology may be readily modified. For example, a system 1200 in accordance with embodiments of the present disclosure may include one or more applications 1202, one or more channels 1204, one or more pool of resources 1206 with each pool being, for example, associated with a respective application, one or more flow switches 1208, one or more pool of resources 1210 managed by a single entity (e.g., one or more drivers 1212), one or more legacy applications 1214, one or more sockets 1216 that enable the transfer of data between the user space and the kernel space, one or more legacy BSD stacks 1218, and one or more reducing ring buffers 1220.

The operation of single entity managed pools of resources is described in co-owned and co-pending U.S. patent application Ser. No. 16/144,992 filed Sep. 27, 2018 and entitled "Methods and Apparatus for Single Entity Buffer Pool Management", which is incorporated herein by reference in its entirety. In the context of legacy applications 1214 operating within, for example, a cellular environment, large bursts of data may be intermittently transmitted/received over an inter-processor communication link from, for example, the inter-processor communication driver 1226 located on the peripheral (e.g., baseband) processor. The transfer of data over the inter-processor communication link between the peripheral (e.g., baseband) processor and the application processor may use a so-called transfer descriptor ring (TDR) 1222 and a so-called completion descriptor ring (CDR) 1224, each of which is further described in, for example, co-owned and co-pending U.S. patent application Ser. No. 16/112,383 filed Aug. 24, 2018 and entitled "Methods and Apparatus for Multiplexing Data Flows via a Single Data Structure", which is incorporated herein by reference in its entirety.

During exemplary operation, the inter-processor communication drivers 1226 and 1212B transact data received from e.g., a cellular network and stores the data into the single-entity managed pool of resources 1210B. The amount of data received from the cellular network that is transferred via, for example, the inter-processor communication link may be bursty (e.g., a burst of multiple Gigabits (Gb) of data every few hundreds of milliseconds due to the "block-based" packet correction and re-ordering techniques described supra). However, the legacy BSD sockets used by the Legacy BSD Stack 1218 are too small to handle these large bursts of data (e.g., less than 192 KB). Consequently, in one exemplary embodiment, the contents of the single-entity managed pool of resources 1210B is used by the flow switch 1208 to fill a reducing ring buffer 1220 in order to smooth out the transfer of this bursty data. The reducing ring 1220 can be used to, for example, provide packets to the BSD socket 1216 in small chunks (e.g., 192 KB) at very high rates (e.g., 1.5 ms apart).

In some implementations, the size of the single-entity managed pool of resources 1210, as well as the size of the reducing ring buffer 1220, is selected in order to maximize (and/or match) the capabilities of, for example, the cellular network. For example, the foregoing embodiment is configured to service a network that has a data rate of 1 Gb/s; e.g., the single-entity managed pool of resources 1210 and the reducing ring buffer 1220 may be sized for 192 KB increments (or "chunks" of data) one-hundred eighty (180) times every 1.5 ms. As but another non-limiting example, for a network that has a data rate of 600 Mbps, the single-entity managed pool of resources 1210 and the reducing ring buffer 1220 may be sized for 192 KB increments (or "chunks" of data) eighty (80) times every 1.5 ms. While specific examples have been set forth herein, it would be readily apparent to one of ordinary skill given the contents of the present disclosure that the size and frequency of the chunks of data may be made larger or smaller. For example, the size of the reducing ring buffer 1220 may be made bigger (or smaller) in some implementations and/or the frequency of data transfers may be made more (or less) frequent in accordance with some implementations. For example, the size and/or frequency of the data transfers facilitated by the reducing ring buffer 1220 may be less when the system 1200 is operating in, for example, a congested network as compared with, for example, operation within a non-congested network, as but one non-limiting example.

In some implementations, the reducing ring buffer 1220 and/or the flow switch apparatus 1208 may constitute physical memory within the system 1200. The flow switch 1008 apparatus may be responsible for transferring data between pool 1206 and pool 1210. For example, the flow switch apparatus 1208 may read data from one pool resource (e.g., pool 1206A) and write this data to another pool resource (e.g., pool 1210B) and vice versa. Similarly, the reducing ring buffer 1220 may read data from one pool resource (e.g., pool resource 1210B) and write this data to the legacy BSD stack 1218 for transfer through the socket 1216. As an alternative implementation, the flow switch apparatus 1208, and/or reducing ring buffer 1220, may redirect a pointer so as to enable data to be transferred from one pool resource (e.g., pool 1210B) to another pool resource (e.g., pool 1206A) and vice versa, or to the legacy BSD stack 1218. In some variants, this data may be compressed prior to transfer and decompressed prior to being read and/or may be encrypted prior to transfer and decrypted prior to being read. These and other variants would be readily apparent to one of ordinary skill given the contents of the present disclosure.

Figure 13:
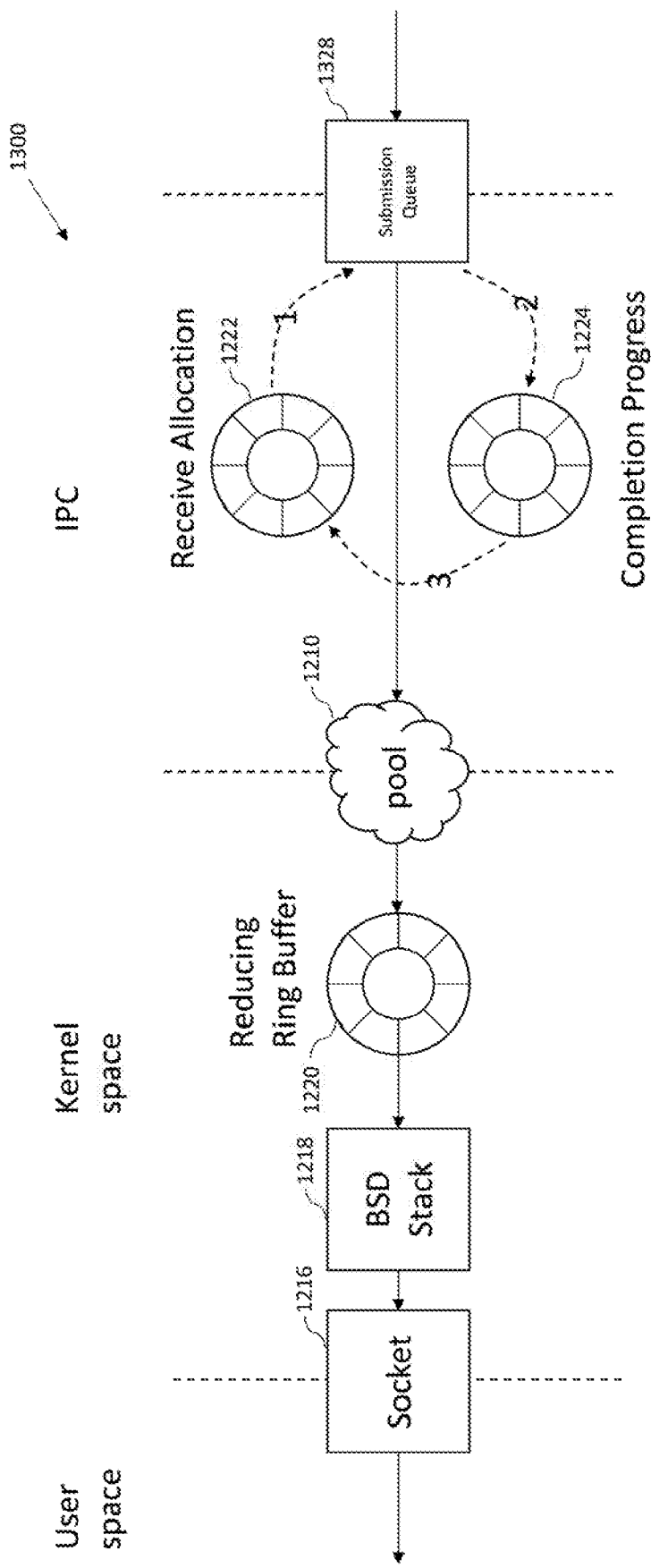
FIG. 13 is a logical representation for a system that normalizes packet flow in bursty conditions utilized in the system of, for example, FIG. 12, in accordance with various aspects of the present disclosure.

Referring now to FIG. 13, a system 1300 that normalizes data flow in bursty networking conditions is shown and described in detail. The system 1300 includes a submission queue 1328 which receives data over a network. For example, the network may include a cellular network as was previously described with respect to FIG. 12 described supra. In some implementations, the network may consist of a non-cellular wireless network (e.g., a Wi-Fi network, a Bluetooth® network, etc.) or even a wired network (e.g., Ethernet, PCIe, etc.). A system (such as system 1200) may service two or more of the aforementioned networking protocols and hence, may include two or more of the systems 1300 shown in FIG. 13. The size of the submission queue 1328 may be dynamically (or statically) sized in accordance with, for example, the networking protocol that the system 1300 services. For example, the submission queue 1328 size may be set by, for example, a driver which services the networking protocol and may vary dependent upon, for example, the maximum data rate that is supported by the given networking technology. As but one non-limiting example, the size of the submission queue 1328 may differ between a submission queue that services a cellular network as opposed to a submission queue that services a Wireless Local Area Network (WLAN), or a submission queue that services a Bluetooth (BT) link.

In the exemplary context of an inter-processor communication protocol, receive buffers are allocated via the receive allocation ring buffer 1222 (e.g., a TDR). Subsequent to the allocation of the receive allocation ring buffer, the submission queue 1328 will fill the receive buffers. Once these receive buffers have been filled the completion progress ring buffer (e.g., a CDR) may indicate that the buffers are ready to be delivered to the single-entity managed pool of resources 1210. In some implementations, the completion progress ring buffer may also indicate to the submission queue 1328 that it has been freed for receipt of additional data. Note that while primarily described in the context of ring buffers, the use of ring buffers is merely exemplary and other types of buffer architectures may be readily utilized instead of (or in addition to) the aforementioned ring buffer architectures, the aforementioned ring buffer architectures merely being exemplary. As a brief aside, ring buffer architectures may be advantageous as this type of buffer architecture may lend itself well to buffering, for example, received data streams.

More directly, while the foregoing example is presented within the context of a receive data path, the various techniques described herein may be used with equal success in the transmit direction. For example, a user space networking stack may need to send large amounts of data to a legacy BSD stack on e.g., a nearby tethered device. In such a scenario, transmit buffers would be allocated via a transmit allocation ring buffer (e.g., a TDR). Subsequent to the allocation of the transmit allocation ring buffer, the reducing ring will fill the transmit buffers in appropriately sized data chunks (e.g., 192 KB). Thereafter, the submission queue may transmit data from the transmit buffers to the attached BSD stack without overflowing BSD sockets. Once the transmit buffers have been sent, the completion progress ring buffer (e.g., a CDR) indicates that the buffers are ready to be filled with more data for transfer.

As described elsewhere herein, the reducing ring buffer 1220 may be sized so as to accommodate, for example, the maximum throughput offered by the underlying networking protocol that the reducing ring buffer 1220 services. In the exemplary context of cellular networks, the network may restrict the transfer of data from the network to the cellular device, dependent upon the perceived ability of the device to handle such throughput. Accordingly, by sizing the reducing ring buffer 1220 so as to accommodate maximum cellular network throughput, the network may infer that the cellular device can handle the maximum link capacity for data throughput. Consequently, by removing the BSD socket bottleneck, the cellular network will not "throttle" service to the cellular device (e.g., system 1200, 1300). In other words, from the cellular network's perspective, the cellular device can take as much data as the radio link quality will bear.

Artisans of ordinary skill in the related arts, given the contents of the present disclosure, will readily appreciate that other considerations may be chosen for some implementations. For example, the prior choice of interval and rate (e.g., eighty (80) 192 KB buffers over 1.5 ms) was selected because the baseband processor may have, inter alia, an inherent delay of greater than 4 ms for cellular receive processing and/or may be related to data throughput considerations. For example, the prior example of eighty (80) 192 KB packets every 1.5 ms may yield a 640 Mbps throughput assuming a 1500B packet size (e.g., 80 packets*1500B*1000/1.5*8). In other variants, the baseband processor may have a greater or smaller processing delay and/or may be optimized with different parameters for other data throughput considerations. For example, technologies with shorter delays (e.g., Wi-Fi, BT, etc.), may have a smaller interval of time associated with the delivery intervals, while technologies with longer delays may use larger intervals of time for delivery. Additionally, data throughput considerations may also affect the delivery interval. These and other variations would be readily apparent to one of ordinary skill given the contents of the present disclosure.

In some implementations, the size of the reducing ring buffer 1220 may be optimized for latency. For example, a shorter ring (i.e., a smaller buffer) may provide less protection against the "peakiness" or "burstiness" of delivered packets to the socket 1216; however, a shorter ring may improve upon latency in providing these packets to the socket 1216. In other words, a shorter ring will hold data for less time (thereby improving latency).

Moreover, the size and/or frequency of packet delivery may be optimized for so-called processing churn. For example, delivering a packet to the socket 1216 may trigger a context switch as the packet is transferred from the kernel space to the user space. Accordingly, more frequent packets may be undesirable because of, for example, unnecessary context switches (e.g., "churn"). Conversely, less frequent packets may be desirable so as to reduce this processing churn.

These and other variations would be readily apparent to one of ordinary skill given the contents of the present disclosure.

Referring now to FIG. 14, a generalized method 1400 for transferring (e.g., receiving and/or transmitting) regulated data at a socket interface (for example, between kernel space and user space) at regular intervals is shown and described in detail. At operation 1410, data is transferred over a network interface. As used herein, the term "network interface" may refer to any signal, data, and/or software interface with a component, network, and/or process. By way of non-limiting example, a network interface may include one or more of cellular (e.g., 3G, LTE/LTE-A/TD-LTE, GSM, and/or other cellular technology), Wi-Fi (802.11), WiMAX (802.16), PAN (e.g., 802.15), Ethernet (e.g., 10/100, 10/100/1000 (Gigabit Ethernet), 10-Gig-E, and/or other Ethernet implementations), FireWire (e.g., FW400, FW110, and/or other variation.), USB (e.g., USB2), MoCA, Coaxsys (e.g., TVnet™), radio frequency tuner (e.g., in-band or OOB, cable modem, and/or other protocol), IrDA families, and/or other network interfaces. For example, cellular data may be received at a baseband processor, wireless data may be received at a Wi-Fi and/or BT module, Ethernet data may be received at an Ethernet networking modem, etc.

At operation 1420, the transferred data may be processed resulting in, for example, the bursty transfer of data to other physical components and/or software modules within the system. For example, in the context of cellular networks, a baseband processor may hold onto the received data in order to perform block-based coding (e.g., turbo decoding, reed-solomon decoding, interleaver based decoding, etc.) before providing this data to, for example, the application processor.

More generally, the techniques described herein may be broadly suitable for any "block-based" technique that receives and processes a block of data (with some delay) before outputting a result. Such block-based data checking may result in intermittent bursts of very large amounts of data (e.g., 10 Gb/s). For example, received data (in the form of packets) may be received out-of-order. As a result, processes associated with placing these received packets back in-order may result in, for example, the bursty transfer of this received data to other physical components and/or software modules. These and other variations would be readily apparent to one of ordinary skill given the contents of the present disclosure.

At operation 1430, the bursty transfer of data is regulated (e.g., delayed) so as to provide for the regular transfer of this received bursty transfer of data. In some implementations, the regulation of the bursty transfer of data is accomplished via use of a reducing ring circular buffer. For example, the reducing ring buffer may be filled by a single-managed pool resource. The reducing ring buffer may then be subsequently depleted of buffer entries, before then being subsequently filled again by the single-managed pool resource. As but another non-limiting example, a circular array of pointers is applied to the managed pool of resources. Subsequently, this circular array of pointers manages data transfers between the single-entity managed pool of resources and a socket residing between, for example, user space and kernel space. As but yet another non-limiting example, the reducing ring buffer may be simultaneously (or near simultaneously) filled and depleted in order to transfer data packets between the single-entity managed pool of resources and the socket. Additionally, or alternatively, the reducing ring buffer may simultaneously (or near simultaneously) update pointer references to the single-managed pool of resources while simultaneously (or near simultaneously) servicing data transfers with the socket. These and other variations would be readily apparent to one of ordinary skill given the contents of the present disclosure.

At operation 1440, the regulated data may be received at the socket in order to service requests located within, for example, user space at regular (or near regular) intervals.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for regulating bursty data transferred within a device, the method comprising:
    receiving data from a data network via a network interface, and storing the received data into a first pool of resources of a kernel space;
    processing the received data, the processing of the received data resulting in a bursty transfer of the data with a first processing apparatus;
    regulating the bursty transfer of the data, the regulating of the bursty transfer comprising causing a ring buffer of a flow switch in the kernel space to:
    select a size of the ring buffer based at least on data relating to one or more network capabilities associated with the data network;
    read at least a portion of the stored data in the first pool of resources; and
    provide, to a socket associated with a legacy application implemented in a user space, a plurality of data portions of the at least portion of the data stored in the first pool of resources of the kernel space, each of the plurality of data portions being sized according to a capability of the socket and provided to the socket according to a prescribed temporal interval;
    transfer, using the flow switch, data between the first pool of resources and a second pool of resources in the kernel space, wherein the second pool of resources is associated with a user space application that includes a user space protocol stack, and wherein the user space application communicates with the flow switch in the kernel space without using the socket or any other socket, and the legacy application communicates with the flow switch through the socket; and
    receiving, by the legacy application, the regulated bursty transfer data using at least the socket, the socket interfacing the user space to the kernel space.

2. The method of claim 1, further comprising dynamically setting a reducing rate for the ring buffer, the dynamic setting of the reducing rate being based at least on channel conditions associated with a network in communication with the network interface.

3. The method of claim 2, further comprising setting a size of a submission queue to a first size, the first size being larger than a second size, the setting of the first size of the submission queue reducing a likelihood that the network will throttle a bandwidth associated with the device as compared with setting the submission queue at the second size.

4. The method of claim 1, further comprising receiving the bursty transfer of the data from the first processing apparatus at a second processing apparatus over a communications link.

5. The method of claim 4, further comprising receiving a plurality of data over a plurality of differing network interfaces; and
    individually regulating transfer of the received plurality of data to the user space.

6. The method of claim 1, wherein the transferring of the data over the network interface comprises allocating at least a portion of the data via a transfer descriptor ring, and indicating via a completion descriptor ring that the at least portion of the data is ready to be stored.

7. A system for regulating bursty data transfers, the system comprising:
    a first processing apparatus in signal communication with a second processing apparatus over a communications link, the first processing apparatus configured to receive data from a network over a network interface in data communication with the system, and to store the received data into a first pool of resources of a kernel space; and
    a flow switch communicatively coupled to the first pool of resources, the first processing apparatus, and the second processing apparatus, and configured to:
    process the data received over the network interface, the processing of the received data resulting in a bursty transfer of the data received over the communications link, the processing of the data comprising identifying a plurality of portions of the received data; and
    regulate the bursty transfer of the received data to a legacy application via one or more sockets, the regulating of the bursty transfer comprising:
    identifying a socket configured for use with the legacy application implemented in a user space; and
    providing from the kernel space, via at least the socket, one or more portions of the plurality of portions of the received data at a transaction rate determined based at least on a status of the network, wherein the flow switch is further configured to transfer data between the first pool of resources and a second pool of resources in the kernel space, wherein the second pool of resources is associated with a user space application that includes a user space protocol stack, and wherein the user space application communicates with the flow switch in the kernel space without using the identified socket or any other socket, and the legacy application communicates with the flow switch through the identified socket.

8. The system of claim 7, wherein the first processing apparatus comprises a baseband processor, the second processing apparatus comprises an application processor, and the communication link comprises an inter-processor communication link.

9. The system of claim 8, wherein the regulating of the transfer of the bursty transfer of the received data comprises use of a reducing ring buffer contained within the flow switch, the reducing ring buffer configured to transfer the received data at regular intervals and at regular sizes.

10. The system of claim 9, wherein the reducing ring buffer is further configured to:
dynamically set a reducing rate for the reducing ring buffer, the dynamic setting of the reducing rate being based on the status of the network, the status comprising channel conditions associated with the network in data communication with the network interface.

11. The system of claim 9, wherein the processing of the received data comprises a block-based packet correction and re-order of the received data.

12. The system of claim 9, wherein the network interface comprises a plurality of differing network interfaces, the plurality of differing network interfaces being selected from the group consisting of: a cellular network interface, a Wi-Fi network interface, and a Bluetooth network interface.

13. The system of claim 7, wherein the system further comprises a plurality of applications stored thereon, the plurality of applications comprising the user space application that includes the user space protocol stack and the legacy application that communicates with the flow switch through at least the identified socket.

14. The system of claim 7, wherein the receiving data from the network over the network interface comprises allocating at least a portion of the data via a transfer descriptor ring, and indicating via a completion descriptor ring that the at least portion of the data is ready to be stored.

15. A non-transitory computer readable apparatus comprising a storage medium having one or more computer programs stored thereon, and configured to, when executed by a processor apparatus, cause a computerized apparatus to:
receive data from a data network via a network interface;
store the received data into a first pool of resources of a kernel space;
process the received data, the processing of the received data resulting in a bursty transfer of the received data from a first processing apparatus;
regulate transfer of the bursty transfer of the received data to a legacy application in a user space; and
receive the regulated data at a socket, the socket interfacing the user space with the kernel space;
wherein the regulating of the transfer comprises identifying a plurality of chunks of the received data by a flow switch in the kernel space, each of the plurality of chunks having a size selected according to a parameter associated with the socket so as to enable a data structure, configured to transfer at least portions of the received data, to cause individual transfer of at Last a portion of the plurality of chunks via the socket, wherein the individual transfer is configured to be performed at a prescribed transfer rate, the prescribed transfer rate based at least on a parameter associated with the data network, wherein the flow switch is further configured to transfer data between the first pool of resources and a second pool of resources in the kernel space, wherein the second pool of resources is associated with a user space application that includes a user space protocol stack, and wherein the user space application communicates with the flow switch in the kernel space without using the socket or any other socket, and the legacy application communicates with the flow switch through the socket.

16. The non-transitory computer readable apparatus of claim 15, wherein the regulating of the transfer of the bursty transfer of the received data comprises use of a reducing ring buffer within the flow switch.

17. The non-transitory computer readable apparatus of claim 16, wherein the one or more computer programs are further configured to, when executed by the processor apparatus, cause the computerized apparatus to:
dynamically set a reducing rate for the reducing ring buffer, the reducing rate being based on channel conditions associated with a network in communication with the network interface.

18. The non-transitory computer readable apparatus of claim 17, wherein the one or more computer programs are further configured to, when executed by the processor apparatus, cause the computerized apparatus to:
set a size of a submission queue to a first size, the first size being larger than a second size, the setting of the first size of the submission queue reducing a likelihood that the network will throttle bandwidth for a device as compared with a setting of the second size of the submission queue.

19. The non-transitory computer readable apparatus of claim 15, wherein the processing of the received data comprises a block-based packet correction and re-order of the received data.

20. The non-transitory computer readable apparatus of claim 15, further comprising a plurality of applications stored thereon including the user space application and the legacy application, the user space application being configured to implement its communication stack in the user space and the legacy application being configured to implement its communication stack in the kernel space.

* * * * *